US012684511B2

(12) United States Patent
Ma et al.

(10) Patent No.: US 12,684,511 B2
(45) Date of Patent: Jul. 14, 2026

(54) METHOD FOR TIME-DOMAIN GRANULARITY CONVERSION, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Dongjun Ma, Dongguan (CN); Nande Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 266 days.

(21) Appl. No.: 18/434,397

(22) Filed: Feb. 6, 2024

(65) Prior Publication Data

US 2024/0259973 A1 Aug. 1, 2024

Related U.S. Application Data

(63) Continuation of application No. PCT/CN2021/128904, filed on Nov. 5, 2021.

(51) Int. Cl.
*H04W 56/00* (2009.01)
(52) U.S. Cl.
CPC .............................. *H04W 56/0045* (2013.01)
(58) Field of Classification Search
CPC . H04W 56/00; H04W 56/001; H04W 56/004; H04W 56/0045; H04W 28/0236;
(Continued)

(56) References Cited

U.S. PATENT DOCUMENTS

2014/0044108 A1* 2/2014 Earnshaw ............. G01S 5/0063
370/336
2018/0027511 A1* 1/2018 Yilmaz ................. H04L 7/0033
370/324
(Continued)

FOREIGN PATENT DOCUMENTS

CN 109391966 A 2/2019
CN 109451845 A 3/2019
(Continued)

OTHER PUBLICATIONS

International Search Report in the international application No. PCT/CN2021/128904, mailed on May 30, 2022 with English translation.
(Continued)

*Primary Examiner* — Warner Wong
(74) *Attorney, Agent, or Firm* — Ladas & Parry, LLP

(57) ABSTRACT

Provided in the embodiments of the present application are a wireless communication method, a terminal device, and a network device. A terminal device sends first information for determining a timing offset value to a network device, where the first information is a first parameter with a first time-domain granularity, and/or the first information is a second parameter with the first time-domain granularity, the first time-domain granularity being a time-domain granularity associated with a subcarrier, the first parameter being used for representing a delay of a service link estimated by the terminal device, and the second parameter being used for representing a Timing Advance (TA).

6 Claims, 11 Drawing Sheets

<u>200</u>

(58) Field of Classification Search
CPC ....... H04W 72/0446; H04L 2027/0097; H04L
27/2655; H04L 27/2663; H04L 27/2665;
H04L 27/2671
See application file for complete search history.

(56) References Cited

U.S. PATENT DOCUMENTS

| | | | | |
|---|---|---|---|---|
| 2019/0386723 | A1* | 12/2019 | Lin | ................... H04L 27/26025 |
| 2020/0029293 | A1 | 1/2020 | Zhang | |
| 2020/0267609 | A1* | 8/2020 | Ly | ..................... H04W 36/0085 |
| 2020/0322908 | A1* | 10/2020 | Prakash | .............. H04W 56/004 |
| 2021/0029658 | A1* | 1/2021 | Mahalingam | ........ H04B 7/1851 |
| 2021/0235406 | A1 | 7/2021 | Llu | |
| 2021/0345280 | A1* | 11/2021 | Zhang | .............. H04W 56/0005 |
| 2022/0408389 | A1* | 12/2022 | Wang | ................ H04W 56/0045 |
| 2023/0072049 | A1* | 3/2023 | Ersbo | ................... H04L 5/0078 |
| 2023/0198822 | A1* | 6/2023 | Liu | ..................... H04L 27/2621 |
| | | | | 375/260 |
| 2023/0217397 | A1* | 7/2023 | Zhou | ................ H04W 56/0045 |
| | | | | 370/503 |
| 2023/0413097 | A1* | 12/2023 | Lin | ....................... H04L 1/1864 |

FOREIGN PATENT DOCUMENTS

| | | | | |
|---|---|---|---|---|
| WO | 2020221165 | A1 | 11/2020 | |
| WO | WO-2021068259 | A1 * | 4/2021 | ........... H04W 88/04 |
| WO | 2021159726 | A1 | 8/2021 | |
| WO | 2021161710 | A1 | 8/2021 | |

OTHER PUBLICATIONS

Written Opinion of the International Search Authority in the international application No. PCT/CN2021/128904, mailed on May 30, 2022 with English translation.

3GPP TSG RAN WG1 #106-bis-e R1-2109076, e-Meeting, Oct. 11 -19, 2021, Source: OPPO, Title: Discussion on timing relationship enhancement, Agenda Item: 8.4.1, Document for: Discussion and Decision.

3GPP TSG RAN WG1 Meeting #106bis-e R1-2109168, e-Meeting, Oct. 11-19, 2021, Agenda Item: 8.4.1, Source: MediaTek Inc., Title: Timing relationship enhancements for NR-NTN, Document for: Discussion and Decision.

3GPP TSG RAN WG1 #106b-e R1-2110031, e-Meeting, Oct. 11-19, 2021, Agenda Item: 8.4.1, Source: Apple, Title: Discussion on Timing Relationship Enhancements for NR NTN, Document for: Discussion/Decision.

3GPP TSG RAN WG1 #106b-e R1-2109609, e-Meeting, Oct. 11-19, 2021, Source: Intel Corporation, Title: On timing relationship enhancements for NTN, Agenda item: 8.4.1, Document for: Discussion and Decision.

3GPP TSG RAN WG1 Meeting #106b-e R1-2109343, e-Meeting, Oct. 11-19, 2021, Source : CAICT, Title : Timing relationship enhancements to support NTN, Agenda Item : 8.4.1, Document for : Discussion / Decision.

R1-210Xxxx, FL Summary on enhancements on UL time and frequency synchronization for nr ntn_v003_thales_oppo, 3GPP tsg_ran\wg1_rl1, Apr. 13, 2021.

First Office Action of the corresponding Chinese patent application No. 202180100611.1, issued on Mar. 18, 2026, with search report.

* cited by examiner

100

Service link

Transparent
forwarding
satellite

Feeder link

UE

NTN gateway    gNB

Core
Network

<u>200</u>

| Terminal device | | Network device |
|---|---|---|

S210, A terminal device sends first information for determining a timing offset value to a network device, where the first information is a first parameter with a first time-domain granularity, and/or the first information is a second parameter with the first time-domain granularity; the first time-domain granularity is a time-domain granularity associated with a subcarrier, the first parameter is used for representing a delay of a service link estimated by the terminal device, and the second parameter is used for representing a TA S220, The network device receives the first information sent by the terminal device

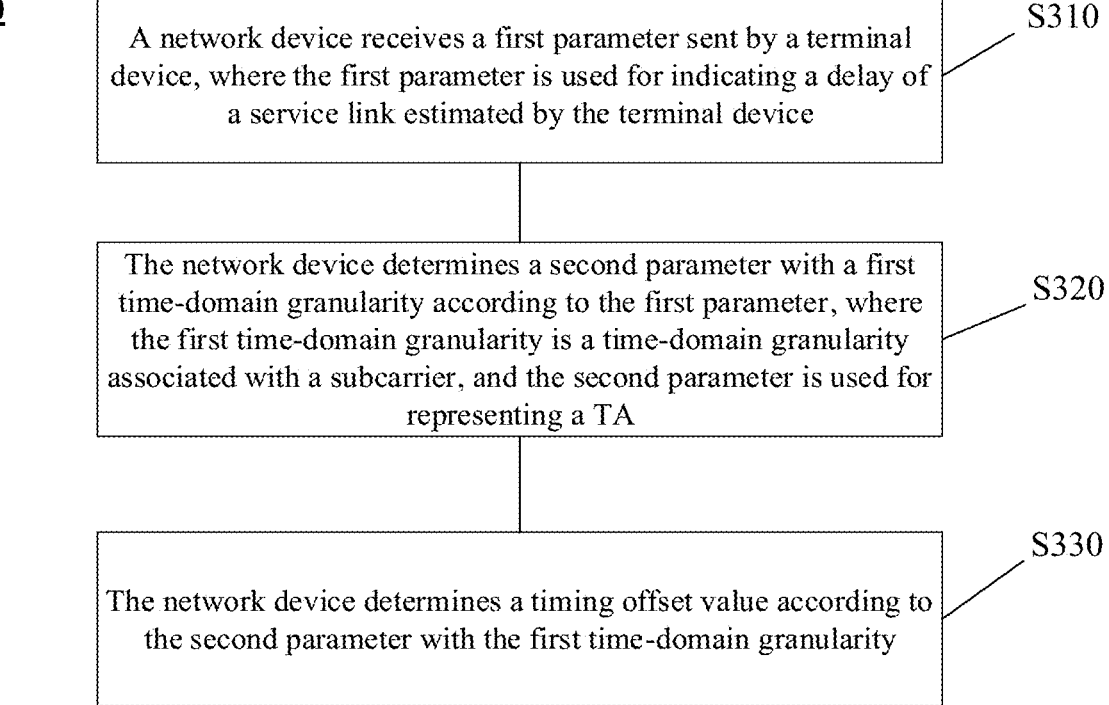

A network device receives a first parameter sent by a terminal device, where the first parameter is used for indicating a delay of a service link estimated by the terminal device

S310

The network device determines a second parameter with a first time-domain granularity according to the first parameter, where the first time-domain granularity is a time-domain granularity associated with a subcarrier, and the second parameter is used for representing a TA

S320

The network device determines a timing offset value according to the second parameter with the first time-domain granularity

Network device 500

Communicating unit 510

FIG. 7

METHOD FOR TIME-DOMAIN GRANULARITY CONVERSION, TERMINAL DEVICE, AND NETWORK DEVICE

CROSS-REFERENCE TO RELATED APPLICATION

This application is a continuation of International Patent Application No. PCT/CN2021/128904 filed on Nov. 5, 2021, the disclosure of which is incorporated by reference in its entirety.

BACKGROUND

In a Non-Terrestrial Networks (NTN) system, due to a large delay between a satellite and a terminal, a timing offset value $K_{offset}$ is introduced to enhance a timing relationship in the NTN system. For example, the network side determines the timing offset value $K_{offset}$ based on a Timing Advance (TA) reported by a terminal. However, since a time-domain granularity of information that is reported by the terminal and used for determining the timing offset value $K_{offset}$ is inconsistent with a time-domain granularity of the timing offset value $K_{offset}$, it is unfavorable for the network device to determine the timing offset value $K_{offset}$.

SUMMARY

Embodiments of the present disclosure relate to the field of communications, and more particularly to a wireless communication method, a terminal device and a network device.

Embodiments of the present disclosure provide a wireless communication method, a terminal device and a network device. The terminal device converts the time-domain granularity of information that is reported by the terminal device and used for determining a timing offset value $K_{offset}$ to be consistent with a time-domain granularity of the timing offset value $K_{offset}$, thereby facilitating the network device to determine the timing offset value $K_{offset}$.

In a first aspect, there is provided a wireless communication method including that: a terminal device sends first information for determining a timing offset value. The first information is a first parameter with a first time-domain granularity, and/or the first information is a second parameter with the first time-domain granularity; and the first time-domain granularity is a time-domain granularity associated with a subcarrier, the first parameter is used for representing a delay of a service link estimated by the terminal device, and the second parameter is used for representing a TA.

In a second aspect, there is provided a wireless communication method including that: a network device receives first information for determining a timing offset value sent by a terminal device. The first information is a first parameter with a first time-domain granularity, and/or the first information is a second parameter with the first time-domain granularity; and the first time-domain granularity is a time-domain granularity associated with a subcarrier, the first parameter is used for representing a delay of a service link estimated by the terminal device, and the second parameter is used for representing a TA.

In a third aspect, there is provided a terminal device including a processor and a transceiver. The processor is configured to cooperate with the transceiver to perform the method in the first aspect.

In a fourth aspect, there is provided a network device including a processor and a transceiver. The processor is configured to cooperate with the transceiver to perform the method in the second aspect.

BRIEF DESCRIPTION OF THE DRAWINGS

FIG. 4 is a schematic interactive flowchart of a wireless communication method according to an embodiment of the present disclosure.

FIG. 5 is a schematic flowchart of a wireless communication method according to an embodiment of the present disclosure.

FIG. 7 is a schematic block diagram of a network device according to an embodiment of the present disclosure.

DETAILED DESCRIPTION

Figure 1:
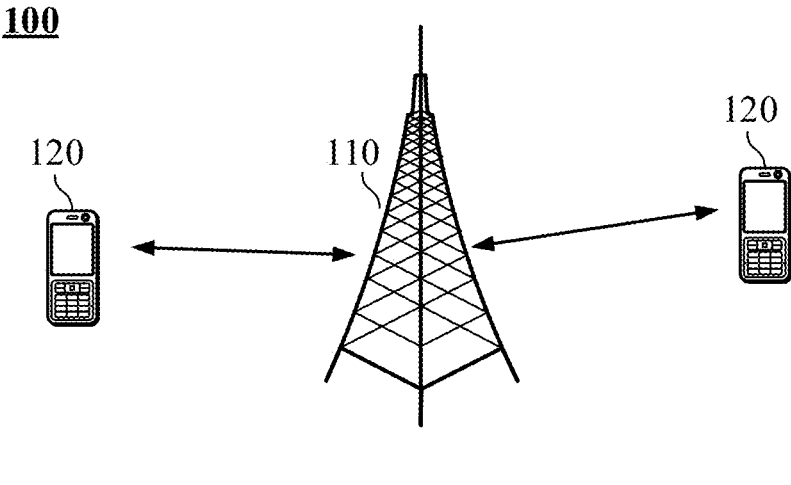
FIG. 1 is a schematic diagram of a communication system architecture to which embodiments of the present disclosure are applied.

The technical schemes of the embodiments of the present disclosure would be described in conjunction with the accompanying drawings in the embodiments of the present disclosure. It is apparent that the described embodiments are only part of the embodiments of the present disclosure, not all the embodiments. All other embodiments obtained by those of ordinary skill in the art with respect to the embodiments of the present disclosure without creative efforts all fall within the scope of protection of the present disclosure.

The technical schemes in the embodiments of the present disclosure may be applied to various communication systems, such as: a Global System Of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system for NR system, a LTE-based access to Unlicensed Spectrum (LTE-U) system, a NR-based access to Unlicensed Spectrum (NR-U) system, a Non-Terrestrial Networks (NTN) system, a Universal Mobile Telecommunication System (UMTS), a Wireless Local Area Network (WLAN), an Internet of Things (IoT), a Wireless Fidelity (Wi-Fi), a 5th-generation (5G) system or other communication systems.

Generally speaking, traditional communication systems support a limited number of connections and are easy to implement. However, with the development of communication technology, mobile communication systems will not only support traditional communication, but also support, for example, Device to Device (D2D) communication, Machine To Machine (M2M) communication, Machine Type Communication (MTC), Vehicle To Vehicle (V2V) communication, or Vehicle to everything (V2X) communication, etc. The embodiments of the present disclosure may also be applied to these communication systems.

In some embodiments, the communication system in the embodiments of the present disclosure may be applied to a Carrier Aggregation (CA) scenario, a Dual Connectivity (DC) scenario, and a Standalone (SA) network distribution scenario.

In some embodiments, the communication system in the embodiments of the present disclosure may be applied to an unlicensed spectrum, and the unlicensed spectrum may also be considered as a shared spectrum. Optionally, the communication system in the embodiments of the present disclosure may also be applied to a licensed spectrum, and the licensed spectrum may also be considered as a non-shared spectrum.

In some embodiments, the communication system in the embodiments of the present disclosure may be applied to a Frequency Range 1 (FR1) band (corresponding to a frequency band from 410 MHz to 7.125 GHz), applied to a FR2 (corresponding to a frequency band from 24.25 GHz to 52.6 GHz), and also applied to new frequency ranges, such as a higher frequency band corresponding to a frequency band from 52.6 GHz to 71 GHz or a higher frequency band corresponding to a frequency band from 71 GHz to 114.25 GHz.

The embodiments of the present disclosure are described in connection with a network device and a terminal device. The terminal device may also be referred to as User Equipment (UE), an access terminal, a user unit, a user station, a mobile station, a remote station, a remote terminal, a mobile device, a user terminal, a terminal, a wireless communication device, a user agent or a user device, etc.

The terminal device may be a Station (ST) in the WLAN, a cellular telephone, a cordless telephone, a Session Initiation Protocol (SIP) telephone, a Wireless Local Loop (WLL) station, a Personal Digital Assistant (PDA) device, a handheld device having a wireless communication function, a computing device or other processing device connected to a wireless modem, a vehicle-mounted device, a wearable device, a terminal device in a next generation communication system such as an NR network, or a terminal device in a future evolved Public Land Mobile Network (PLMN) network, etc.

In the embodiments of the present disclosure, the terminal device may be deployed on land, and include indoor or outdoor device, hand-held device, wearable device or vehicle-mounted device. The terminal device may also be deployed on the water (such as on the ships, etc.). The terminal device may also be deployed in the air (such as, in airplanes, in balloons and in satellites, etc.).

In the embodiments of the present disclosure, the terminal device may be a mobile phone, a Pad, a computer with wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, a vehicle-mounted communication device, a wireless communication chip/Application Specific Integrated Circuit (ASIC)/System on Chip (SoC), etc.

By way of example and not limitation, in the embodiments of the present disclosure, the terminal device may also be a wearable device. The wearable device may also be referred to as a wearable smart device, which is a general term of wearable devices that are intelligently designed and developed by applying wearable technology to daily wear, such as, glasses, gloves, watches, clothing and shoes. The wearable device is a portable device that is worn directly on the body or integrated into the user's clothes or accessories. The wearable device is not only a kind of hardware device, but also realizes powerful functions through software support, data interaction and cloud interaction. The generalized wearable smart device has full functions and a large size, and the generalized wearable smart device may realize complete or partial functions without relying on smart phones, such as smart watches or smart glasses, and the generalized wearable smart device only focus on certain application functions and need to be used in conjunction with other devices (such as, smart phones), such as, various smart bracelets and smart jewelry for monitoring physical signs.

In the embodiments of the present disclosure, the network device may be a device configured to communicate with a mobile device, and the network device may be an access point (AP) in a WLAN, a Base Transceiver Station (BTS) in a GSM or CDMA, a NodeB (NB) in a WCDMA, an evolved Node B (eNB or eNodeB) in an LTE, a relay station or an access point, a vehicle-mounted device, a wearable device, a network device or a gNB in an NR network, a network device in a future evolved PLMN network or a network device in an NTN network, etc.

By way of example and not limitation, in the embodiments of the present disclosure, the network device may have mobility characteristics, for example, the network device may be a mobile device. In some embodiments, the network device may be a satellite, a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, and the like. In some embodiments, the network device may also be a base station located on land, water, etc.

In the embodiments of the present disclosure, the network device may provide services for a cell, and the terminal device communicates with the network device through transmission resources (e.g., frequency-domain resources, or spectrum resources) used by the cell. The cell may be a cell corresponding to the network device (e.g., base station), and the cell may belong to a macro base station or a base station corresponding to a small cell. The small cell may include a metro cell, a micro cell, a Pico cell, a Femto cell, etc. These small cells have characteristics of small coverage and low transmission power, and the small cells are suitable for providing high-speed data transmission services.

Exemplarily, FIG. 1 illustrates a communication system 100 to which the embodiments of the present disclosure are applied. The communication system 100 may include a network device 110 that communicates with a terminal device 120 (or referred to as a communication terminal, or a terminal). The network device 110 may provide communication coverage for a particular geographic area and may communicate with terminal devices located within the coverage.

FIG. 1 exemplarily illustrates one network device and two terminal devices. In some embodiments, the communication system 100 may include multiple network devices, and other numbers of terminal devices may be included within the coverage of each network device, which is not limited by the embodiments of the present disclosure.

In some embodiments, the communication system 100 may also include other network entities, such as, network controllers, mobility management entities, etc., which are not limited by the embodiments of the present disclosure.

It is to be understood that a device having a communication function in the network or system in the embodiments of the present disclosure may be referred to as a communication device. The communication system 100 illustrated in FIG. 1 is taken as an example, the communication device may include a network device 110 and terminal devices 120 that both have the communication function, and the network device 110 and the terminal devices 120 may be the devices described above, which will not be described herein. The communication device may also include other devices in the communication system 100, such as, network controllers, mobility management entities and other network entities, which are not limited in the embodiments of the present disclosure.

It is to be understood that the terms "system" and "network" are often used interchangeably herein. In the present disclosure, the term "and/or" is only an association relationship describing associated objects and represents that three relationships may exist. For example, A and/or B may represent three conditions: i.e., independent existence of A, existence of both A and B and independent existence of B. In addition, the character "/" in the present disclosure generally indicates that the relationship between the related objects is "or".

It is to be understood that the present disclosure relates to a first communication device and a second communication device. The first communication device may be a terminal device, such as, a mobile phone, a machine facility, a Customer Premise Equipment (CPE), an industrial device, a vehicle, etc. The second communication device may be a communication device that is opposite to the first communication device, such as, a network device, a mobile phone, an industrial device, a vehicle, etc. The present disclosure are described taking the first communication device being a terminal device and the second communication device being a network device as specific examples.

Terms used in the embodiments of the present disclosure are used only for explanation of specific embodiments of the present disclosure and the terms are not intended to limit the present disclosure. The terms "first", "second" and the like in the description and claims of the present disclosure and the accompanying drawings are used to distinguish different objects and are not used to describe a particular sequence. Furthermore, the terms "including/comprising" and "having" and any variations thereof are intended to cover non-exclusive inclusion.

It is to be understood that the "indication" mentioned in the embodiments of the present disclosure may be a direct indication, may be an indirect indication, or may be indicative of an association. For example, A indicates B, which may mean that A directly indicates B, for example, B may be obtained through A; it may also mean that A indirectly indicates B, for example, A indicates C, and B may be obtained by C; and it may also indicate that there is an association between A and B.

In the description of the embodiments of the present disclosure, the term "correspond" may mean that there is a direct correspondence or an indirect correspondence between the two, may also mean that there is an association relationship between the two, and may also be a relationship between indication and being indicated, configuration and being configured, etc.

In the embodiments of the present disclosure, the "predefined" or "predefined rules" may be achieved by pre-storing corresponding codes, tables or other means used for indicating relevant information in devices (e.g., including terminal devices and network devices), and the specific implementation thereof is not limited in the present disclosure. For example, predefined may refer to what is defined in the protocol.

In the embodiments of the present disclosure, the "protocol" may be a standard protocol in the communication field. For example, the protocol may include an LTE protocol, an NR protocol, and related protocols applied in future communication systems, which are not limited in the present disclosure.

In order to facilitate understanding of the technical schemes of the embodiments of the present disclosure, the technical schemes of the embodiments of the present disclosure are described below through following specific embodiments, and the following related technologies, as optional schemes, can be arbitrarily combined with the technical schemes of the embodiments of the present disclosure, all of which belong to the protection scope of the embodiments of the present disclosure. The embodiments of the present disclosure include at least some of the following contents.

In the NTN system, due to the large delay between the base station and the terminal device, the terminal device needs a TA to send an uplink signal before the uplink signal is sent, so as to ensure that the signal arrives at the base station side (such as gNB) at a correct time. Since too large TA will affect a timing relationship between the uplink and downlink, and the case where a time when the uplink signal is sent is before a time when the downlink signal arrives may occur, $K_{offset}$ is introduced to enhance the existing timing relationship. For example, the gNB obtains the $K_{offset}$ through the TA reported by the terminal device, and then uses the $K_{offset}$ to enhance the timing relationship in the NTN system. The TA has a time-domain resource granularity $T_c$. Moreover, the time-domain resource granularity of the $K_{offset}$ is determined to be a slot, and the time-domain resource granularity of the content for reporting the TA is also determined to be a slot.

For a better understanding of the embodiments of the present disclosure, the Satellite (SAT) communications in two scenarios are described below taking FIG. 2 and FIG. 3 as examples, respectively.

For a first scenario: an SAT access transparent forwarding mode

Figure 2:
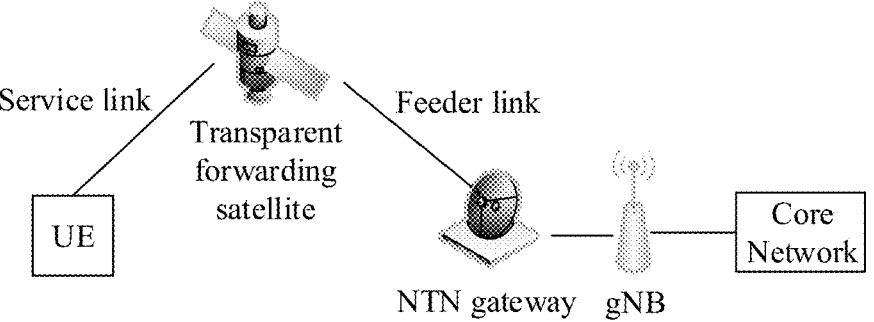
FIG. 2 is a schematic diagram of a transparent forwarding communication according to the present disclosure.

FIG. 2 illustrates a scenario where a single SAT is used for transparent forwarding in the NTN system including a SAT communication system. As shown in the figure, only one SAT exists on a communication link between the terminal device and the base station (i.e., the gNB), and the SAT does not process received information, but only transparently forwards the received information. In the first scenario, the base station (i.e., the gNB) is still deployed on the ground. When the terminal device communicates with the base station (i.e., the gNB), the SAT forwards the signal, and the SAT does not process the received information. In this case, the SAT is equivalent to a relay node or transponder. This scenario can be called as a transparent payload mode. In the transparent payload mode, the SAT only transparently forwards the received signals, and the terrestrial base station transmits the forwarded signals to a core network. In turn, the information returned from the core network to the terminal device is also transmitted to the terminal device through the transparent forwarding performed by the SAT.

For a second scenario: an SAT access regenerative forwarding mode

Figure 3:
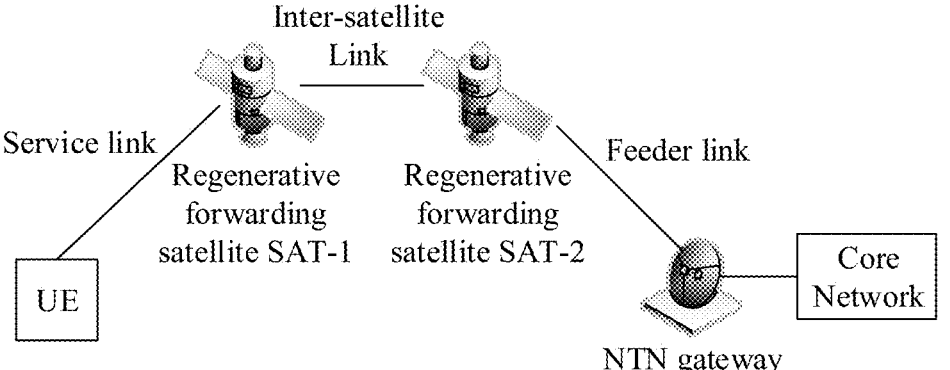
FIG. 3 is a schematic diagram of a regenerative forwarding communication according to the present disclosure.

FIG. 3 illustrates a scenario where more than one SAT is used for regenerative forwarding in the NTN network including a SAT communication system. As shown in the figure, each of the SAT-1 and the SAT-2 integrates all or part of functions of a base station, and is connected to the core network through NTN gateways (also known as terrestrial gateways). Different from the transparent forwarding mode, the SAT-1 and/or the SAT-2 herein may process the received information. Optionally, these processes include, but are not limited to, operations originally performed by the terrestrial base station, such as encrypting the received information, decrypting the received information, padding and\or changing parameters of the information, etc. In addition, as shown in the figure, SAT-1 is connected to the terminal device, and SAT-2 is connected to the core network. Optionally, when information from the terminal device is forwarded, the SAT-1 forwards the information to the SAT-2, and the SAT-2 forwards the information to the core network. Optionally, the SAT-1 and/or the SAT-2 may process the forwarded information during the process of forwarding the information. In turn, information returned from the core network to the terminal device is also forwarded to the terminal device through the SAT-2 and the SAT-1, and the SAT-1 and/or the SAT-2 may process the forwarded information accordingly. This SAT access regenerative forwarding mode shown in the second scenario may also be called as a regenerative payload mode.

As will be readily appreciated by those skilled in the art, FIG. 3 schematically shows only two satellites SAT-1 and SAT-2. Optionally, two or more SATs may be included in the satellite access regenerative forwarding mode shown in FIG. 3. For example, the information transmission path between the SAT-1 and the SAT-2 may also include one or more other satellites SAT-3, SAT-4, SAT-5 . . . SAT-n, each of which may transparently forward and/or process the received information. The SAT-1 and SAT-2 may form one or more satellite transmission paths with at least one of the one or more satellites SAT-3, SAT-4, SAT-5 . . . SAT-n. For example, a satellite transmission path SAT path-1 includes satellites SAT-1, SAT-3 and SAT-2; a satellite transmission path SAT path-2 includes satellites SAT-1, SAT-4 and SAT-2, a satellite transmission path SAT path-3 includes satellites SAT-1, SAT-3, SAT-4 and SAT-2, etc. In the present disclosure, adjacent satellites on each satellite transmission path are connected through Inter-satellite Links (ISL), and each ISL corresponds to a satellite hop.

In order to facilitate a better understanding of the embodiments of the present disclosure, the problems solved by the present disclosure are explained.

In the Non-Terrestrial Networks (NTN) system, due to a large delay between a satellite and a terminal, a timing offset value $K_{offset}$ is introduced to enhance a timing relationship in the NTN system. For example, the network side determines the timing offset value $K_{offset}$ based on a Timing Advance (TA) reported by a terminal. However, since a time-domain granularity of information that is reported by the terminal and used for determining the timing offset value $K_{offset}$ is inconsistent with a time-domain granularity of the timing offset value $K_{offset}$, it is unfavorable for the network device to determine the timing offset value $K_{offset}$.

The technical schemes of the present disclosure will be described in detail through specific embodiments below.

FIG. 4 is a schematic flowchart of a wireless communication method 200 according to an embodiment of the present disclosure. As shown in FIG. 4, the wireless communication method 200 may include at least some of the following contents.

In operation S210, a terminal device sends first information for determining a timing offset value to a network device, where the first information is a first parameter with a first time-domain granularity, and/or the first information is a second parameter with the first time-domain granularity; and the first time-domain granularity is a time-domain granularity associated with a subcarrier, the first parameter is used for representing a delay of a service link estimated by the terminal device, and the second parameter is used for representing a TA.

In operation S220, the network device receives the first information sent by the terminal device.

In the embodiment of the present disclosure, the network device determines the timing offset value $K_{offset}$ based on the first parameter with the first time-domain granularity, and/or, the network device determines the timing offset value $K_{offset}$ based on the second parameter with the first time-domain granularity. Furthermore, the network device may configure the determined timing offset value $K_{offset}$ for the terminal device or indicate the determined timing offset value $K_{offset}$ to the terminal device, so that the terminal device may perform uplink transmission based on the timing offset value $K_{offset}$. For example, it is assumed that the network device schedules the terminal device to send uplink data in a slot n (the slot n is a slot subjected to synchronization based on the TA), and in this case, the existing timing relationship is required to be enhanced by the terminal device to send the uplink data on the slot $n+K_{offset}$ so as to avoid the uplink transmission from the terminal device occurring before the downlink scheduling, where the $K_{offset}$ is greater than or equal to the TA of the terminal device.

In some embodiments, a time-domain granularity of the timing offset value $K_{offset}$ is also associated with the subcarrier.

In the embodiment of the present disclosure, the first parameter or the second parameter that is reported by the terminal device and used for determining the timing offset value has a time-domain granularity associated with the subcarrier, and the time-domain granularity of the timing offset value is also associated with the subcarrier. That is to say, the terminal device may convert the time-domain granularity of the information for determining the timing offset value $K_{offset}$ that is reported by the terminal device to be consistent with the time-domain granularity of the timing offset value $K_{offset}$, thereby facilitating the network device to determine the timing offset value $K_{offset}$.

In some embodiments, the first time-domain granularity is a slot, or the first time-domain granularity is another time-domain granularity associated with the subcarrier or a sub-carrier spacing, which is not limited herein.

It is to be noted that the service link may be the communication link between the terminal device and the satellite as shown in FIG. 2 and FIG. 3.

In some embodiments, the first information may be carried by one of the following:

Uplink Control Information (UCI), Radio Resource Control (RRC) signaling, or Media Access Control Control Element (MAC CE) signaling.

For example, the first information may be one or more information elements (IE) in the signaling carrying the first information. For example, the information elements may be fields, elements or domains.

In some embodiments, in a case where the first information includes the first parameter with the first time-domain granularity, the terminal device converts a time-domain resource granularity of the first parameter from a second time-domain granularity into the first time-domain granularity, to obtain the first parameter with the first time-domain granularity.

That is to say, the terminal device initially acquires the first parameter with the second time-domain granularity, and then the terminal device converts the time-domain resource granularity of the first parameter from the second time-domain granularity into the first time-domain granularity, to obtain the first parameter with the first time-domain granularity.

In some embodiments, the time-domain granularity of the first parameter is $T_c$ or second (s). Of course, the first parameter may have other time-domain granularities, which is not limited in the present disclosure.

In some embodiments, $T_c$ is a time unit specified in a protocol.

For example, $T_c = 1/(\Delta f_{max} \cdot N_f)$, where $\Delta f_{max} = 480 \cdot 10^3$ Hz, and $N_f = 4096$.

Of course, $\Delta f_{max}$ and $N_f$ may also have other values, which are not limited in the present disclosure.

In some embodiments, the first time-domain granularity is a slot and the second time-domain granularity is $T_c$.

In some embodiments, the first parameter is $N_{TA,UE\text{-}specific}$. That is to say, $N_{TA,UE\text{-}specific}$ is used for representing a delay estimated by the terminal device on a service link.

In other words, $N_{TA,UE\text{-}specific}$ is an UE self-estimated TA to pre-compensate for the service link delay.

In some embodiments, the terminal device converts the time-domain resource granularity of the first parameter from $T_c$ into the slot according to following Formula 1:

$$\left\lceil N_{TA,UE\text{-}specific} \times T_c / \left(10^{-3}/2^{\wedge}\mu\right)\right\rceil = \qquad \text{Formula 1}$$
$$\left(\left\lceil 2^{\mu} * 10^3 * N_{TA,UE\text{-}specific} \times T_c \right\rceil\right),$$

where $N_{TA,UE\text{-}specific}$ is the first parameter, $\mu$ represents a subcarrier spacing configuration, and $\lceil \ \rceil$ represents upward rounding.

That is to say, in the Formula 1, $\lceil N_{TA,UE\text{-}specific} \times T_c / (10^{-3}/2^{\wedge}\mu)\rceil = (\lceil 2^{\mu} * 10^3 * N_{TA,UE\text{-}specific} \times T_c \rceil)$ slots.

In some embodiments, correspondences among $\mu$, the subcarrier $\Delta f$ and the slot may be as shown in Table 1.

TABLE 1

| $\mu$ | $\Delta f = 2^{\mu} \cdot 15$[kHz] | Number of slots contained in one subframe |
|---|---|---|
| 0 | 15 | 1 |
| 1 | 30 | 2 |
| 2 | 60 | 4 |
| 3 | 120 | 8 |
| 4 | 240 | 16 |

It is to be noted that the correspondences in Table 1 also may be applied to the case where $\Delta f = 480$ kHz, $\Delta f = 960$ kHz, or $\Delta f$ has other values, which are not limited in the present disclosure.

In some embodiments, in a case where the first information includes the second parameter with the first time-domain granularity, the terminal device determines the second parameter with the first time-domain granularity according to a time-domain granularity of a target parameter.

The target parameter includes at least one of: $N_{TA}$, $N_{TA,UE\text{-}specific}$, $N_{TA,common}$ or $N_{TA,offset}$.

$N_{TA}$ represents a parameter associated with TA and configured by a network device, $N_{TA,UE\text{-}specific}$ represents the delay of the service link estimated by the terminal device, $N_{TA,common}$ represents a delay between a satellite and a reference point, and $N_{TA,offset}$ represents a fixed offset value for calculating TA.

For example, $N_{TA}$ is derived from the terminal device specific TA self-estimation. For the Physical Random Access Channel (PRACH), $N_{TA}$ is defined as 0, and $N_{TA}$ is updated according to a TA command field and an MAC CE TA command in the Message 2 (msg2) in the four-step random access procedure or the Message B (msgB) in the two-step random access procedure.

For example, $N_{TA,common}$ represents the delay between the satellite and the reference point. If the network broadcasts $N_{TA,common}$, then $N_{TA,common}$ is acquired at least from a common timing offset value and may also include some timing offsets on the network side. In other words, $N_{TA,common}$ is a common TA controlled by the network device and may include any timing offsets deemed necessary by the network side. $N_{TA,common}$ may have a value of 0.

In some embodiments, the reference point or a position of the reference point is configured by the network device. Optionally, the reference point or the position of the reference point is determined based on synchronization assistance information configured by the network device.

For example, $N_{TA,offset}$ represents the fixed offset value for calculating TA.

For example, for the FR1 FDD band or the FR1 TDD band, there is neither the coexistence of the Evolved Universal Terrestrial Radio Access Network (E-UTRAN) and the NR, nor the coexistence of the Narrow Band Internet of Things (NB-IoT) and the NR, and $N_{TA,offset}$ (in unit $T_c$)=25600.

For another example, for the FR1 FDD band where the E-UTRA and the NR coexist and/or the FR1 FDD band where the NB-IoT and the NR coexist, $N_{TA,offset}$ (in unit $T_c$)=0.

For another example, for the FR1 TDD band where the E-UTRA and the NR coexist and/or the FR1 TDD band where the NB-IoT and the NR coexist, $N_{TA,offset}$ (in unit $T_c$)=39936.

For another example, for the FR2, $N_{TA,offset}$ (in unit $T_c$)=13792.

In some embodiments, the second parameter is $T_{TA}$, and $T_{TA}$ may be determined by following Formula 2.

$$T_{TA} = (N_{TA} + N_{TA,UE\text{-}specific} + N_{TA,common} + N_{TA,offset}) \times T_c \qquad \text{Formula 2}$$

In some embodiments, the target parameter includes $N_{TA,UE\text{-}specific}$, and $N_{TA,UE\text{-}specific}$ has a time-domain granularity $T_c$. In this case, the terminal device determines the second parameter with the time-domain granularity $T_c$ according to the $N_{TA,UE\text{-}specific}$ with the time-domain granularity $T_c$; and the terminal device converts a time-domain granularity of the second parameter from $T_c$ into the first time-domain granularity, to obtain the second parameter with the first time-domain granularity.

In some embodiments, the first time-domain granularity is a slot, and the second parameter is $T_{TA}$. The terminal device converts the time-domain granularity of the second parameter from $T_c$ to the slot according to following Formula 3:

$$\left\lceil T_{TA} \times T_C \Big/ \left(10^{-3}/2^\wedge \mu\right)\right\rceil = \left(\lceil 2^\mu * 10^3 * T_{TA} \times T_c\rceil\right), \qquad \text{Formula 3}$$

where $\mu$ represents a subcarrier spacing configuration, and $\lceil\ \rceil$ represents upward rounding.

That is to say, in the Formula 3, $\lceil T_{TA}\times T_c/(10^{-3}/2^\wedge\mu)\rceil = (\lceil 2^\mu * 10^3 * T_{TA}\times T_c\rceil)$ slots.

In some embodiments, the target parameter includes: $N_{TA}$, $N_{TA,UE\text{-}specific}$, $N_{TA,common}$ and $N_{TA,offset}$, and each of $N_{TA}$, $N_{TA,UE\text{-}specific}$, $N_{TA,common}$, and $N_{TA,offset}$ has a time-domain granularity $T_c$. In this case, the terminal device respectively converts the time-domain granularity of each of $N_{TA}$, $N_{TA,UE\text{-}specific}$, $N_{TA,common}$ and $N_{TA,offset}$ from $T_c$ into the first time-domain granularity; and the terminal device accumulates $N_{TA}$ with the first time-domain granularity, $N_{TA,UE\text{-}specific}$ with the first time-domain granularity, $N_{TA,common}$ with the first time-domain granularity, and $N_{TA,offset}$ with the first time-domain granularity, to obtain the second parameter with the first time-domain granularity.

In some embodiments, $N_{TA}$ has the time domain granularity $T_c$, and the first time-domain granularity is a slot. In this case, the terminal device converts the time-domain granularity of $N_{TA}$ from $T_c$ into the slot according to following Formula 4:

$$\left\lceil N_{TA} \times T_C \Big/ \left(10^{-3}/2^\wedge \mu\right)\right\rceil = \left(\lceil 2^\mu * 10^3 * N_{TA} \times T_c\rceil\right), \qquad \text{Formula 4}$$

where $\mu$ represents a subcarrier spacing configuration, and $\lceil\ \rceil$ represents upward rounding.

That is to say, in the Formula 4, $\lceil N_{TA}\times T_c/(10^{-3}/2^\wedge\mu)\rceil = (\lceil 2^\mu * 10^3 * N_{TA}\times T_c\rceil)$ slots.

In some embodiments, $N_{TA,UE\text{-}specific}$ has the time domain granularity $T_c$, and the first time-domain granularity is a slot. In this case, the terminal device converts the time-domain granularity of $N_{TA,UE\text{-}specific}$ from $T_c$ into the slot according to the Formula 1.

In some embodiments, $N_{TA,common}$ has the time domain granularity $T_c$, and the first time-domain granularity is a slot. In this case, the terminal device converts the time-domain granularity of $N_{TA,common}$ from $T_c$ into the slot according to following Formula 5:

$$\left\lceil N_{TA,common} \times T_C \Big/ \left(10^{-3}/2^\wedge \mu\right)\right\rceil = \left(\lceil 2^\mu * 10^3 * N_{TA,common} \times T_c\rceil\right), \qquad \text{Formula 5}$$

where $\mu$ represents a subcarrier spacing configuration, and $\lceil\ \rceil$ represents upward rounding.

That is to say, in the Formula 5, $\lceil N_{TA,common}\times T_c/(10^{-3}/2^\wedge\mu)\rceil = (\lceil 2^\mu * 10^3 * N_{TA,common}\times T_c\rceil)$ slots.

In some embodiments, $N_{TA,offset}$ has the time domain granularity $T_c$, and the first time-domain granularity is a slot. In this case, the terminal device converts the time-domain granularity of $N_{TA,offset}$ from $T_c$ into the slot according to following Formula 6:

$$\left\lceil N_{TA,offset} \times T_C \Big/ \left(10^{-3}/2^\wedge \mu\right)\right\rceil = \left(\lceil 2^\mu * 10^3 * N_{TA,offset} \times T_c\rceil\right), \qquad \text{Formula 6}$$

where $\mu$ represents a subcarrier spacing configuration, and $\lceil\ \rceil$ represents upward rounding.

That is to say, in the Formula 6, $\lceil N_{TA,offset}\times T_c/(10^{-3}/2^\wedge\mu)\rceil = (\lceil 2^\mu * 10^3 * N_{TA,offset}\times T_c\rceil)$ slots.

In some embodiments, the target parameter includes: $N_{TA}$, $N_{TA,UE\text{-}specific}$, $N_{TA,common}$ and $N_{TA,offset}$, each of $N_{TA}$, $N_{TA,common}$ and $N_{TA,offset}$ has a time-domain granularity $T_c$, and a time-domain granularity of $N_{TA,UE\text{-}specific}$ is not $T_c$. In this case, the terminal device respectively converts the time-domain granularity of each of $N_{TA}$, $N_{TA,common}$ and $N_{TA,offset}$ from $T_c$ into the first time-domain granularity; the terminal device converts the time-domain granularity of $N_{TA,UE\text{-}specific}$ into the first time-domain granularity; and the terminal device accumulates $N_{TA}$ with the first time-domain granularity, $N_{TA,UE\text{-}specific}$ with the first time-domain granularity, $N_{TA,common}$ with the first time-domain granularity, and $N_{TA,offset}$ with the first time-domain granularity, to obtain the second parameter with the first time-domain granularity.

In some embodiments, each of $N_{TA}$, $N_{TA,common}$ and $N_{TA,offset}$ has the time-domain granularity $T_c$, and the first time-domain granularity is the slot. In this case, the terminal device converts the time-domain granularity of each of $N_{TA}$, $N_{TA,common}$ and $N_{TA,offset}$ from $T_c$ into the slot according to the Formula 4 to Formula 6, respectively.

In some embodiments, the first time-domain granularity is the slot, and $N_{TA,UE\text{-}specific}$ has a time-domain granularity s. In this case, the terminal device converts the time-domain granularity of $N_{TA,UE\text{-}specific}$ from s into the slot according to following Formula 7:

$$\left\lceil N_{TA,UE\text{-}specific} \times s \Big/ \left(10^{-3}/2^\wedge \mu\right)\right\rceil = \left(\lceil 2^\mu * 10^3 * N_{TA,UE\text{-}specific} \times s\rceil\right), \qquad \text{Formula 7}$$

where $\mu$ represents a subcarrier spacing configuration, and $\lceil\ \rceil$ represents upward rounding.

That is to say, in the Formula 7, $\lceil N_{TA,UE\text{-}specific}\times s/(10^{-3}/2^\wedge\mu)\rceil = (\lceil 2^\mu * 10^3 * N_{TA,UE\text{-}specific}\times s\rceil)$ slots.

In some embodiments, the target parameter includes: $N_{TA}$, $N_{TA,UE\text{-}specific}$, $N_{TA,common}$ and $N_{TA,offset}$, each of $N_{TA}$, $N_{TA,common}$ and $N_{TA,offset}$ has a time-domain granularity $T_c$, and a time-domain granularity of $N_{TA,UE\text{-}specific}$ is not $T_c$. In this case, the terminal device accumulates $N_{TA}$ with the time-domain granularity $T_c$, $N_{TA,common}$ with the time-domain granularity $T_c$, and $N_{TA,offset}$ with the time-domain granularity $T_c$, to obtain a first accumulated value; the terminal device converts a time-domain granularity of the first accumulated value from $T_c$ into the first time-domain granularity; the terminal device converts the time-domain granularity of $N_{TA,UE\text{-}specific}$ into the first time-domain granularity; and the terminal device accumulates the first accumulated value with the first time-domain granularity and $N_{TA,UE\text{-}specific}$ with the first time-domain granularity, to obtain the second parameter with the first time-domain granularity.

In some embodiments, the first time-domain granularity is the slot. The terminal device converts the time-domain granularity of the first accumulated value from $T_c$ into the slot according to following Formula 8:

$$\left\lceil N_{summation} \times T_c \Big/ \left(10^{-3}/2^\wedge \mu\right)\right\rceil = \left(\lceil 2^\mu * 10^3 * N_{summation} \times T_c\rceil\right), \qquad \text{Formula 8}$$

where $N_{summation}$ represents the first accumulated value, $N_{summation} = N_{TA} + N_{TA,common} + N_{TA,offset}$, $\mu$ represents a subcarrier spacing configuration, and $\lceil\ \rceil$ represents upward rounding.

That is to say, in the above Formula 8, $\lceil N_{summation} \times T_c / (10^{-3}/2^{\wedge}\mu) \rceil = (\lceil 2^{\mu} * 10^3 * N_{summation} \times T_c \rceil)$ slots.

Therefore, in the embodiments of the present disclosure, the first parameter and/or the second parameter that are used for determining the timing offset value and reported by the terminal device have the time-domain granularities associated with the subcarrier. That is to say, time-domain resource granularities of the first parameter and/or the second parameter for determining the timing offset value may be converted into time-domain resource granularities (i.e., slots) associated with different subcarriers, so as to ensure that the network side acquires the $K_{offset}$ whose time-domain resource granularity is the slot, and ensure the correct timing relationship between the uplink and downlink scheduling transmission. Moreover, the present disclosure proposes multiple schemes for the time-domain granularity conversion, which increases the flexibility of conversion.

FIG. 5 is a schematic flowchart of a wireless communication method 300 according to an embodiment of the present disclosure. As shown in FIG. 5, the wireless communication method 300 may include at least some of the following contents.

In operation S310, a network device receives a first parameter sent by a terminal device, where the first parameter is used for indicating a delay for a service link estimated by the terminal device.

In operation S320, the network device determines a second parameter with a first time-domain granularity according to the first parameter, where the first time-domain granularity is a time-domain granularity associated with a subcarrier, and the second parameter is used for representing a TA.

In operation S330, the network device determines a timing offset value according to the second parameter with the first time-domain granularity.

In some embodiments, a time-domain granularity of the timing offset value $K_{offset}$ is also associated with the subcarrier.

In some embodiments, the first time-domain granularity is a slot, or the first time-domain granularity is another time-domain granularity associated with the subcarrier or a subcarrier spacing, which is not limited herein.

It is to be noted that the service link may be a communication link between the terminal device and the satellite as shown in FIG. 2 and FIG. 3.

In some embodiments, the first parameter may be carried by one of the following:

UCI, RRC signaling, or MAC CE signaling.

For example, the first parameter may be one or more IEs in the signaling carrying the first parameter. For example, the information elements may be fields, elements or domains.

In some embodiments, a time-domain granularity of the first parameter is $T_c$ or second (s). Of course, the first parameter may have other time-domain granularities, which is not limited in the present disclosure.

In some embodiments, $T_c$ is a time unit specified in a protocol.

For example, $T_c=1/(\Delta f_{max} \cdot N_f)$, where $\Delta f_{max}=480 \cdot 10^3$ Hz, and $N_f=4096$.

Of course, $\Delta f_{max}$ and $N_f$ may also have other values, which are not limited in the present disclosure.

In some embodiments, the first parameter has the time-domain granularity $T_c$; and the operation S320 may specifically include that:

the network device determines the second parameter with the time-domain granularity $T_c$ according to the first parameter with the time-domain granularity $T_c$;

the network device converts the time-domain granularity of the second parameter from $T_c$ into the first time-domain granularity, to obtain the second parameter with the first time-domain granularity.

In some embodiments, the first time-domain granularity is a slot, and the second parameter is $T_{TA}$. The network device converts the time-domain granularity of the second parameter from $T_c$ to the slot according to following Formula 3:

$$\left\lceil T_{TA} \times T_C \middle/ \left(10^{-3}/2^{\wedge}\mu\right) \right\rceil = \left(\lceil 2^{\mu} * 10^3 * T_{TA} \times T_c \rceil\right). \qquad \text{Formula 3,}$$

where $\mu$ represents a subcarrier spacing configuration, and $\lceil \ \rceil$ represents upward rounding.

That is to say, in the Formula 3, $\lceil T_{TA} \times T_c / (10^{-3}/2^{\wedge}\mu) \rceil = (\lceil 2^{\mu} * 10^3 * T_{TA} \times T_c \rceil)$ slots.

In some embodiments, the correspondences among $\mu$ and the subcarrier $\Delta f$ and the slot may be as shown in Table 1 above.

In some embodiments, the first parameter is $N_{TA,UE\text{-}specific}$; and the operation S320 may specifically include that:

the network device determines the second parameter with the first time-domain granularity according to $N_{TA,UE\text{-}specific}$, and $N_{TA}$, $N_{TA,common}$ and $N_{TA,offset}$, where $N_{TA}$ represents a parameter associated with TA and configured by a network device, $N_{TA,UE\text{-}specific}$ represents the delay of the service link estimated by the terminal device, $N_{TA,common}$ represents a delay between a satellite and a reference point, and $N_{TA,offset}$ represents a fixed offset value for calculating TA.

For example, $N_{TA}$ is derived from the terminal device specific TA self-estimation. For Physical Random Access Channel (PRACH), $N_{TA}$ is defined as 0 and $N_{TA}$ is updated according to a TA command field and an MAC CE TA command in the Message 2 (msg2) in the four-step random access procedure or the Message B (msgB) in the two-step random access procedure.

For example, $N_{TA,common}$ represents the delay between the satellite and the reference point. If the network broadcasts $N_{TA,common}$, then $N_{TA,common}$ is acquired at least from a common timing offset value and may also include some timing offsets on the network side. In other words, $N_{TA,common}$ is a common TA controlled by the network device and may include any timing offsets deemed necessary by the network side. $N_{TA,common}$ may have a value of 0.

In some embodiments, the reference point or a position of the reference point is configured by the network device. Optionally, the reference point or the position of the reference point is determined based on synchronization assistance information configured by the network device.

For example, $N_{TA,offset}$ represents the fixed offset value for calculating TA.

For example, for the FR1 FDD band or the FR1 TDD band, there is neither the coexistence of the Evolved Universal Terrestrial Radio Access Network (E-UTRAN) and the NR, nor the coexistence of the Narrow Band Internet of Things (NB-IoT) and the NR, and $N_{TA,offset}$ (in unit $T_c$)=25600.

For another example, for the FR1 FDD band where the E-UTRA and the NR coexist and/or the FR1 FDD band where the NB-IoT and the NR coexist, $N_{TA,offset}$ (in unit $T_c$)=0.

For another example, for the FR1 TDD band where the E-UTRA and the NR coexist and/or the FR1 TDD band where of the NB-IoT and the NR coexist, $N_{TA,offset}$ (in unit $T_c$)=39936.

For another example, for the FR2, $N_{TA,offset}$ (in unit $T_c$)=13792.

In some embodiments, the second parameter is $T_{TA}$, and $T_{TA}$ may be determined by following formula (2):

$$T_{TA} = (N_{TA} + N_{TA,UE-specific} + N_{TA,common} + N_{TA,offset}) \times T_c, \quad \text{Formula 2}$$

In some embodiments, the value of $N_{TA,common}$ is time-sensitive. For example, the network device may configure a timer corresponding to $N_{TA,common}$. The network device adjusts the value of $N_{TA,common}$ when the timer is timed out, or the network device adjusts the value of $N_{TA,common}$ when the timer expires.

In some embodiments, each of $N_{TA}$, $N_{TA,UE-specific}$, $N_{TA,common}$ and $N_{TA,offset}$ has a time-domain granularity $T_c$. In this case, the network device respectively converts the time-domain granularity of each of $N_{TA}$, $N_{TA,UE-specific}$, $N_{TA,common}$ and $N_{TA,offset}$ from $T_c$ into the first time-domain granularity; and the network device accumulates $N_{TA}$ with the first time-domain granularity, $N_{TA,UE-specific}$ with the first time-domain granularity, $N_{TA,common}$ with the first time-domain granularity, and $N_{TA,offset}$ with the first time-domain granularity, to obtain the second parameter with the first time-domain granularity.

In some embodiments, $N_{TA}$ has the time domain granularity $T_c$, and the first time-domain granularity is a slot. In this case, the network device converts the time-domain granularity of $N_{TA}$ from $T_c$ into the slot according to the following Formula 4:

$$\left\lceil N_{TA} \times T_C \Big/ \left(10^{-3}/2^{\wedge}\mu\right)\right\rceil = \left(\lceil 2^{\mu} * 10^{3} * N_{TA} \times T_c \rceil\right), \quad \text{Formula 4}$$

where $\mu$ represents a subcarrier spacing configuration, and $\lceil \ \rceil$ represents upward rounding.

That is to say, in the Formula 4, $\lceil N_{TA} \times T_c / (10^{-3}/2^{\wedge}\mu)\rceil = (\lceil 2^{\mu} * 10^{3} * N_{TA} \times T_c \rceil)$ slots.

In some embodiments, $N_{TA,UE-specific}$ has the time domain granularity $T_c$, and the first time-domain granularity is a slot. In this case, the network device converts the time-domain granularity of $N_{TA,UE-specific}$ from $T_c$ into the slot according to Formula 1:

$$\left\lceil N_{TA,UE-specific} \times T_c/\left(10^{-3}/2^{\wedge}\mu\right)\right\rceil = \quad \text{Formula 1}$$
$$\left(\lceil 2^{\mu} * 10^{3} * N_{TA,UE-specific} \times T_c \rceil\right) \ldots ,$$

where $N_{TA,UE-specific}$ is the first parameter, $\mu$ represents a subcarrier spacing configuration, and $\lceil \ \rceil$ represents upward rounding.

That is to say, in the Formula 1, $\lceil N_{TA,UE-specific} \times T_c / (10^{-3}/2^{\wedge}\mu)\rceil = (\lceil 2^{\mu} * 10^{3} * N_{TA,UE-specific} \times T_c \rceil)$ slots.

In some embodiments, $N_{TA,common}$ has the time domain granularity $T_c$, and the first time-domain granularity is a slot. In this case, the network device converts the time-domain granularity of $N_{TA,common}$ from $T_c$ into the slot according to following Formula 5.

$$\left\lceil N_{TA,common} \times T_c/\left(10^{-3}/2^{\wedge}\mu\right)\right\rceil = \left(\lceil 2^{\mu} * 10^{3} * N_{TA,common} \times T_c \rceil\right), \quad \text{Formula 5}$$

where $\mu$ represents a subcarrier spacing configuration, and $\lceil \ \rceil$ represents upward rounding.

That is to say, in the Formula 5, $\lceil N_{TA,common} \times T_c / (10^{-3}/2^{\wedge}\mu)\rceil = (\lceil 2^{\mu} * 10^{3} * N_{TA,common} \times T_c \rceil)$ slots.

In some embodiments, $N_{TA,offset}$ has the time domain granularity $T_c$, and the first time-domain granularity is a slot. In this case, the network device converts the time-domain granularity of $N_{TA,offset}$ from $T_c$ into the slot according to following Formula 6:

$$\left\lceil N_{TA,offset} \times T_c/\left(10^{-3}/2^{\wedge}\mu\right)\right\rceil = \left(\lceil 2^{\mu} * 10^{3} * N_{TA,offset} \times T_c \rceil\right), \quad \text{Formula 6}$$

where $\mu$ represents a subcarrier spacing configuration, and $\lceil \ \rceil$ represents upward rounding.

That is to say, in the Formula 6, $\lceil N_{TA,offset} \times T_c / (10^{-3}/2^{\wedge}\mu)\rceil = (\lceil 2^{\mu} * 10^{3} * N_{TA,offset} \times T_c \rceil)$ slots.

In some embodiments, each of $N_{TA}$, $N_{TA,common}$ and $N_{TA,offset}$ has the time-domain granularity $T_c$, and the time-domain granularity of $N_{TA,UE-specific}$ is not $T_c$. In this case, the network device respectively converts the time-domain granularity of each of $N_{TA}$, $N_{TA,common}$ and $N_{TA}$, offset from $T_c$ into the first time-domain granularity; the network device converts the time-domain granularity of $N_{TA,UE-specific}$ into the first time-domain granularity; and the network device accumulates $N_{TA}$ with the first time-domain granularity, $N_{TA,UE-specific}$ with the first time-domain granularity, $N_{TA,common}$ with the first time-domain granularity, and $N_{TA,offset}$ with the first time-domain granularity, to obtain the second parameter with the first time-domain granularity.

In some embodiments, each of $N_{TA}$, $N_{TA,common}$ and $N_{TA,offset}$ has a time-domain granularity $T_c$ and the first time-domain granularity is the slot. In this case, the network device converts the time-domain granularity of each of $N_{TA}$, $N_{TA,common}$ and $N_{TA,offset}$ from $T_c$ into the slot according to the Formula 4 to Formula 6, respectively.

In some embodiments, the first time-domain granularity is the slot, and $N_{TA,UE-specific}$ has the time-domain granularity s. In this case, the network device converts the time-domain granularity of $N_{TA,UE-specific}$ from s into the slot according to following Formula 7:

$$\left\lceil N_{TA,UE-specific} \times s/\left(10^{-3}/2^{\wedge}\mu\right)\right\rceil = \quad \text{Formula 7}$$
$$\left(\lceil 2^{\mu} * 10^{3} * N_{TA,UE-specific} \times s \rceil\right),$$

where $\mu$ represents a subcarrier spacing configuration, and $\lceil \ \rceil$ represents upward rounding.

That is to say, in the Formula 7, $\lceil N_{TA,UE-specific} \times s/(10^{-3}/2^{\wedge}\mu)\rceil = (\lceil 2^{\mu} * 10^{3} * N_{TA,UE-specific} \times s \rceil)$ slots.

In some embodiments, each of $N_{TA}$, $N_{TA,common}$ and $N_{TA,offset}$ has a time-domain granularity $T_c$, and a time-domain granularity of $N_{TA,UE-specific}$ is not $T_c$. In this case, the network device accumulates $N_{TA}$ with the time-domain granularity $T_c$, $N_{TA,common}$ with the time-domain granularity $T_c$, and $N_{TA,offset}$ with the time-domain granularity $T_c$, to obtain a first accumulated value; the network device converts a time-domain granularity of the first accumulated value from $T_c$ into the first time-domain granularity; the network device converts the time-domain granularity of $N_{TA,UE\text{-}specific}$ into the first time-domain granularity; and the network device accumulates the first accumulated value with the first time-domain granularity and $N_{TA,UE\text{-}specific}$ with the first time-domain granularity, to obtain the second parameter with the first time-domain granularity.

In some embodiments, the first time-domain granularity is the slot. The network device converts the time-domain granularity of the first accumulated value from $T_c$ into the slot according to following Formula 8:

$$\lceil N_{summation} \times T_c/(10^{-3}/2^{\wedge}\mu)\rceil = (\lceil 2^{\mu} * 10^3 * N_{summation} \times T_c\rceil), \quad \text{Formula 8}$$

where $N_{summation}$ represents the first accumulated value, $N_{summation} = N_{TA} + N_{TA,common} + N_{TA,offset}$, $\mu$ represents a subcarrier spacing configuration, and $\lceil \; \rceil$ represents upward rounding.

That is to say, in the above Formula 8, $\lceil N_{summation} \times T_c/(10^{-3}/2^{\wedge}\mu)\rceil = (\lceil 2^{\mu} * 10^3 * N_{summation} \times T_c\rceil)$ slots.

Therefore, in the embodiments of the present disclosure, the network device determines the second parameter with the first time-domain granularity according to the first parameter reported by the terminal device, and determines the timing offset value based on the second parameter with the first time-domain granularity. Since the first time-domain granularity is associated with the subcarrier, and the time-domain granularity of the timing offset value is also associated with the subcarrier, i.e., the network device may convert the time-domain granularity of the information for determining the timing offset value $K_{offset}$ that is reported by the terminal device to be consistent with the time-domain granularity of the timing offset value $K_{offset}$, it is favorable for the network device to determine the timing offset value $K_{offset}$.

The method embodiments of the present disclosure have been described in detail above with reference to FIG. 4 to FIG. 5, and the apparatus embodiments of the present disclosure are described in detail below with reference to FIG. 6 to FIG. 11. It is to be understood that the apparatus embodiments correspond to the method embodiments, and similar descriptions of the apparatus embodiments may refer to the method embodiments.

Figure 6:
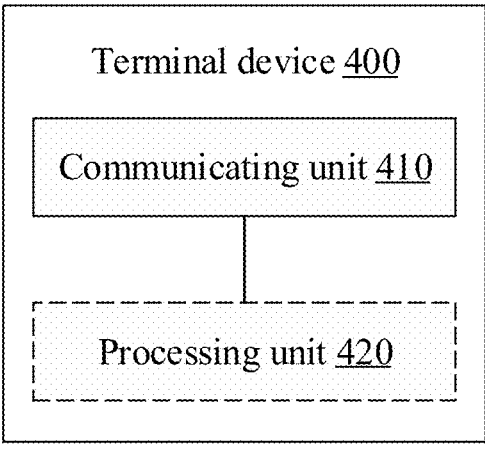
FIG. 6 is a schematic block diagram of a terminal device according to an embodiment of the present disclosure.

FIG. 6 shows a schematic block diagram of a terminal device 400 according to an embodiment of the present disclosure. As shown in FIG. 6, the terminal device 400 includes a communicating unit 410.

The communicating unit 410 is configured to send first information for determining a timing offset value.

The first information is a first parameter with a first time-domain granularity, and/or the first information is a second parameter with the first time-domain granularity. The first time-domain granularity is a time-domain granularity associated with a subcarrier, the first parameter is used for representing a delay of a service link estimated by the terminal device, and the second parameter is used for representing a TA.

In some embodiments, in a case where the first information includes the first parameter with the first time-domain granularity, the terminal device 400 further includes a processing unit 420.

The processing unit 420 is configured to convert a time-domain resource granularity of the first parameter from the second time-domain granularity into the first time-domain granularity, to obtain the first parameter with the first time-domain granularity.

In some embodiments, the first time-domain granularity is a slot, and the second time-domain granularity is $T_c$.

In some embodiments, the processing unit 420 is specifically configured to:

convert the time-domain resource granularity of the first parameter from the second time-domain granularity into the first time-domain granularity according to a following formula:

$$\lceil N_{TA,UE\text{-}specific} \times T_c/(10^{-3}/2^{\wedge}\mu)\rceil = (\lceil 2^{\mu} * 10^3 * N_{TA,UE\text{-}specific} \times T_c\rceil),$$

where $N_{TA,UE\text{-}specific}$ is the first parameter, $\mu$ represents a subcarrier spacing configuration, and $\lceil \; \rceil$ represents upward rounding.

In some embodiments, in a case where the first information includes the second parameter with the first time-domain granularity, the terminal device 400 further includes a processing unit 420.

The processing unit 420 is configured to determine the second parameter with the first time-domain granularity according to a time-domain granularity of a target parameter.

The target parameter includes at least one of: $N_{TA}$, $N_{TA,UE\text{-}specific}$, $N_{TA,common}$ or $N_{TA,offset}$.

$N_{TA}$ represents a parameter associated with TA and configured by a network device, $N_{TA,UE\text{-}specific}$ represents the delay of the service link estimated by the terminal device, $N_{TA,common}$ represents a delay between a satellite and a reference point, and $N_{TA,offset}$ represents a fixed offset value for calculating TA.

In some embodiments, the target parameter includes $N_{TA,UE\text{-}specific}$, and $N_{TA,UE\text{-}specific}$ has a time-domain granularity $T_c$.

The processing unit 420 is specifically configured to:

determine the second parameter with the time-domain granularity $T_c$ according to the $N_{TA,UE\text{-}specific}$ with the time-domain granularity $T_c$;

convert a time-domain granularity of the second parameter from $T_c$ into the first time-domain granularity, to obtain the second parameter with the first time-domain granularity.

In some embodiments, the first time-domain granularity is a slot.

The processing unit 420 is specifically configured to:

convert the time-domain granularity of the second parameter from $T_c$ to the slot according to a following formula:

$$\lceil T_{TA} \times T_c/(10^{-3}/2^{\wedge}\mu)\rceil = (\lceil 2^{\mu} * 10^3 * T_{TA} \times T_c\rceil),$$

where $T_{TA}$ is the second parameter, $\mu$ represents a subcarrier spacing configuration, and $\lceil \; \rceil$ represents upward rounding.

In some embodiments, the target parameter includes: $N_{TA}$, $N_{TA,UE\text{-}specific}$, $N_{TA,common}$ and $N_{TA,offset}$, and each of $N_{TA}$, $N_{TA,UE\text{-}specific}$, $N_{TA,common}$ and $N_{TA,offset}$ has a time-domain granularity $T_c$.

The processing unit 420 is specifically configured to:

respectively convert the time-domain granularity of each of $N_{TA}$, $N_{TA,UE\text{-}specific}$, $N_{TA,common}$ and $N_{TA,offset}$ from $T_c$ into the first time-domain granularity;

accumulate $N_{TA}$ with the first time-domain granularity, $N_{TA,UE\text{-}specific}$ with the first time-domain granularity, $N_{TA,common}$ with the first time-domain granularity, and $N_{TA,offset}$ with the first time-domain granularity, to obtain the second parameter with the first time-domain granularity.

In some embodiments, the first time-domain granularity is a slot.

The processing unit 420 is specifically configured to:

convert the time-domain granularity of $N_{TA}$ from $T_c$ into the slot according to a following formula:

$$\lceil N_{TA} \times T_c/(10^{-3}/2^\wedge\mu) \rceil = (\lceil 2^\mu * 10^3 * N_{TA} \times T_c \rceil);$$

convert the time-domain granularity of $N_{TA,UE\text{-}specific}$ from $T_c$ into the slot according to a following formula:

$$\lceil N_{TA,UE-specific} \times T_c/(10^{-3}/2^\wedge\mu) \rceil = (\lceil 2^\mu * 10^3 * N_{TA,UE-specific} \times T_c \rceil);$$

convert the time-domain granularity of $N_{TA,common}$ from $T_c$ into the slot according to a following formula:

$$\lceil N_{TA,common} \times T_c/(10^{-3}/2^\wedge\mu) \rceil = (\lceil 2^\mu * 10^3 * N_{TA,common} \times T_c \rceil);$$

convert the time-domain granularity of $N_{TA,offset}$ from $T_c$ into the slot according to a following formula:

$$\lceil N_{TA,offset} \times T_c/(10^{-3}/2^\wedge\mu) \rceil = (\lceil 2^\mu * 10^3 * N_{TA,offset} \times T_c \rceil),$$

where $\mu$ represents a subcarrier spacing configuration, and $\lceil \ \rceil$ represents upward rounding.

In some embodiments, the target parameter includes: $N_{TA}$, $N_{TA,UE\text{-}specific}$, $N_{TA,common}$ and $N_{TA,offset}$, each of $N_{TA}$, $N_{TA,common}$ and $N_{TA,offset}$ has a time-domain granularity $T_c$, and a time-domain granularity of $N_{TA,UE\text{-}specific}$ is not $T_c$.

The processing unit 420 is specifically configured to:

respectively convert the time-domain granularity of each of $N_{TA}$, $N_{TA,common}$ and $N_{TA,offset}$ from $T_c$ into the first time-domain granularity;

convert the time-domain granularity of $N_{TA,UE\text{-}specific}$ into the first time-domain granularity; and accumulate $N_{TA}$ with the first time-domain granularity, $N_{TA,UE\text{-}specific}$ with the first time-domain granularity, $N_{TA,common}$ with the first time-domain granularity, and $N_{TA,offset}$ with the first time-domain granularity, to obtain the second parameter with the first time-domain granularity.

In some embodiments, the first time-domain granularity is a slot.

The processing unit 420 is specifically configured to:

convert the time-domain granularity of $N_{TA}$ from $T_c$ into the slot according to a following formula:

$$\lceil N_{TA} \times T_c/(10^{-3}/2^\wedge\mu) \rceil = (\lceil 2^\mu * 10^3 * N_{TA} \times T_c \rceil);$$

convert the time-domain granularity of $N_{TA,common}$ from $T_c$ into the slot according to a following formula:

$$\lceil N_{TA,common} \times T_c/(10^{-3}/2^\wedge\mu) \rceil = (\lceil 2^\mu * 10^3 * N_{TA,common} \times T_c \rceil);$$

converting the time-domain granularity of $N_{TA,offset}$ from $T_c$ into the slot according to a following formula:

$$\lceil N_{TA,offset} \times T_c/(10^{-3}/2^\wedge\mu) \rceil = (\lceil 2^\mu * 10^3 * N_{TA,offset} \times T_c \rceil),$$

where $\mu$ represents a subcarrier spacing configuration, and $\lceil \ \rceil$ represents upward rounding.

In some embodiments, the target parameter includes: $N_{TA}$, $N_{TA,UE\text{-}specific}$, $N_{TA,common}$ and $N_{TA,offset}$, each of $N_{TA}$, $N_{TA,common}$ and $N_{TA,offset}$ has a time-domain granularity $T_c$, and a time-domain granularity of $N_{TA,UE\text{-}specific}$ is not $T_c$.

The processing unit 420 is specifically configured to:

accumulate $N_{TA}$ with the time-domain granularity $T_c$, $N_{TA,common}$ with the time-domain granularity $T_c$, and $N_{TA,offset}$ with the time-domain granularity $T_c$, to obtain a first accumulated value;

convert a time-domain granularity of the first accumulated value from $T_c$ into the first time-domain granularity;

convert the time-domain granularity of $N_{TA,UE\text{-}specific}$ into the first time-domain granularity; and accumulate the first accumulated value with the first time-domain granularity and $N_{TA,UE\text{-}specific}$ with the first time-domain granularity, to obtain the second parameter with the first time-domain granularity.

In some embodiments, the first time-domain granularity is a slot.

The processing unit 420 is specifically configured to:

convert the time-domain granularity of the first accumulated value from $T_c$ into the slot according to a following formula:

$$\lceil N_{summation} \times T_c/(10^{-3}/2^\wedge\mu) \rceil = (\lceil 2^\mu * 10^3 * N_{summation} \times T_c \rceil),$$

where $N_{summation}$ represents the first accumulated value, $N_{summation}=N_{TA}+N_{TA,common}+N_{TA,offset}$, $\mu$ represents a subcarrier spacing configuration, and $\lceil \ \rceil$ represents upward rounding.

In some embodiments, the first time-domain granularity is a slot, and $N_{TA,UE\text{-}specific}$ has a time-domain granularity s.

The processing unit 420 is specifically configured to:

convert the time-domain granularity of $N_{TA,UE\text{-}specific}$ from s into the slot according to a following formula:

$$\lceil N_{TA,UE-specific} \times s/(10^{-3}/2^\wedge\mu) \rceil = (\lceil 2^\mu * 10^3 * N_{TA,UE-specific} \times s \rceil).$$

where $\mu$ represents a subcarrier spacing configuration, and $\lceil \ \rceil$ represents upward rounding.

In some embodiments, the second parameter $T_{TA}$ is determined by a following formula:

$$T_{TA} = (N_{TA} + N_{TA, UE-specific} + N_{TA, common} + N_{TA, offset}) \times T_c.$$

In some embodiments, $T_c$ is a time unit specified in a protocol.

In some embodiments, the communicating unit may be a communication interface or transceiver or an input-output interface of a communication chip or of a system-on-chip. The processing unit may be one or more processors.

It is to be understood that the terminal device 400 in the embodiment of the present disclosure may correspond to the terminal device in the method embodiments in the present disclosure, and that the above operations and other operations and/or functions of the various units in the terminal device 400 are used for implementing the respective flows implemented by the terminal device in the method 200 shown in FIG. 4.

Figure 7:
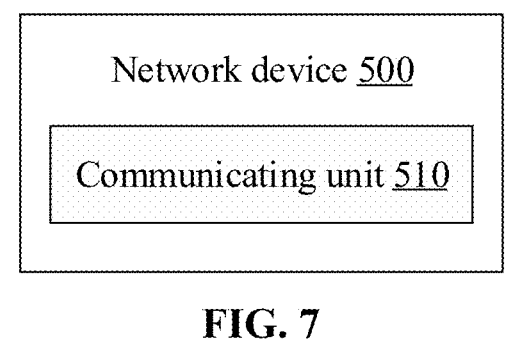

FIG. 7 shows a schematic block diagram of a network device 500 according to an embodiment of the present disclosure. As shown in FIG. 7, the network device 500 includes a communicating unit 510.

The communicating unit 510 is configured to receive first information sent by a terminal device, wherein the first information is used for determining a timing offset value.

The first information is a first parameter with a first time-domain granularity, and/or the first information is a second parameter with the first time-domain granularity. The first time-domain granularity is a time-domain granularity associated with a subcarrier, the first parameter is used for representing a delay of a service link estimated by the terminal device, and the second parameter is used for representing a TA.

In some embodiments, in a case where the first information includes the first parameter with the first time-domain granularity, the first parameter with the first time-domain granularity is determined based on the first parameter with a second time-domain granularity.

In some embodiments, the first time-domain granularity is a slot, and the second time-domain granularity is $T_c$.

In some embodiments, the first parameter with the first time-domain granularity is determined based on a following formula:

$$\left\lceil N_{TA,UE-specific} \times T_c / \left(10^{-3}/2^{\wedge}\mu\right)\right\rceil = \left(\left\lceil 2^{\mu} * 10^3 * N_{TA,UE-specific} \times T_c\right\rceil\right),$$

where $N_{TA,UE-specific}$ is the first parameter, $\mu$ represents a subcarrier spacing configuration, and $\lceil\ \rceil$ represents upward rounding.

In some embodiments, in a case where the first information includes the second parameter with the first time-domain granularity, the second parameter with the first time-domain granularity is determined based on a time-domain granularity of a target parameter.

The target parameter includes at least one of: $N_{TA}$, $N_{TA,UE-specific}$, $N_{TA,common}$ or $N_{TA,offset}$.

$N_{TA}$ represents a parameter associated with TA and configured by a network device, $N_{TA,UE-specific}$ represents the delay of the service link estimated by the terminal device, $N_{TA,common}$ represents a delay between a satellite and a reference point, and $N_{TA,offset}$ represents a fixed offset value for calculating TA.

In some embodiments, the target parameter includes $N_{TA,UE-specific}$, and $N_{TA,UE-specific}$ has a time-domain granularity $T_c$.

The second parameter with the first time-domain granularity is determined based on a second parameter with the time-domain granularity $T_c$, and the second parameter with the time-domain granularity $T_c$ is determined based on the $N_{TA,UE-specific}$ with the time-domain granularity $T_c$.

In some embodiments, the first time-domain granularity is a slot.

The second parameter with the first time-domain granularity is determined based on a following formula:

$$\left\lceil T_{TA} \times T_c / \left(10^{-3}/2^{\wedge}\mu\right)\right\rceil = \left(\left\lceil 2^{\mu} * 10^3 * T_{TA} \times T_c\right\rceil\right),$$

where $T_{TA}$ is the second parameter, u represents a subcarrier spacing configuration, and $\lceil\ \rceil$ represents upward rounding.

In some embodiments, the target parameter includes: $N_{TA}$, $N_{TA,UE-specific}$, $N_{TA,common}$ and $N_{TA,offset}$, and each of $N_{TA}$, $N_{TA,UE-specific}$, $N_{TA,common}$ on and $N_{TA,offset}$ has a time-domain granularity $T_c$.

The second parameter with the first time-domain granularity is obtained by accumulating $N_{TA}$ with the first time-domain granularity, $N_{TA,UE-specific}$ with the first time-domain granularity, $N_{TA,common}$ with the first time-domain granularity, and $N_{TA,offset}$ with the first time-domain granularity.

$N_{TA}$ with the first time-domain granularity is determined based on $N_{TA}$ with the time-domain granularity $T_c$, $N_{TA,UE-specific}$ with the first time-domain granularity is determined based on $N_{TA,UE-specific}$ with the time-domain granularity $T_c$, $N_{TA,common}$ with the first time-domain granularity is determined based on $N_{TA,common}$ with the time-domain granularity $T_c$, and $N_{TA,offset}$ with the first time-domain granularity is determined based on $N_{TA,offset}$ with the time-domain granularity $T_c$.

In some embodiments, the first time-domain granularity is a slot.

$N_{TA}$ with the first time-domain granularity is determined based on a following formula:

$$\left\lceil N_{TA} \times T_c / \left(10^{-3}/2^{\wedge}\mu\right)\right\rceil = \left(\left\lceil 2^{\mu} * 10^3 * N_{TA} \times T_c\right\rceil\right);$$

$N_{TA,UE-specific}$ with the first time-domain granularity is determined based on a following formula:

$$\left\lceil N_{TA,UE-specific} \times T_c / \left(10^{-3}/2^{\wedge}\mu\right)\right\rceil = \left(\left\lceil 2^{\mu} * 10^3 * N_{TA,UE-specific} \times T_c\right\rceil\right);$$

$N_{TA,common}$ with the first time-domain granularity is determined based on a following formula:

$$\left\lceil N_{TA,common} \times T_c / \left(10^{-3}/2^{\wedge}\mu\right)\right\rceil = \left(\left\lceil 2^{\mu} * 10^3 * N_{TA,common} \times T_c\right\rceil\right);$$

$N_{TA,offset}$ with the first time-domain granularity is determined based on a following formula:

$$\left\lceil N_{TA,offset} \times T_c / \left(10^{-3}/2^{\wedge}\mu\right)\right\rceil = \left(\left\lceil 2^{\mu} * 10^3 * N_{TA,offset} \times T_c\right\rceil\right),$$

where $\mu$ represents a subcarrier spacing configuration, and $\lceil\ \rceil$ represents upward rounding.

In some embodiments, the target parameter includes: $N_{TA}$, $N_{TA,UE-specific}$, $N_{TA,common}$ and $N_{TA,offset}$, each of $N_{TA}$, $N_{TA,common}$ and $N_{TA,offset}$ has a time-domain granularity $T_c$, and a time-domain granularity of $N_{TA,UE-specific}$ is not $T_c$.

The second parameter with the first time-domain granularity is obtained by accumulating $N_{TA}$ with the first time-domain granularity, $N_{TA,UE-specific}$ with the first time-domain granularity, $N_{TA,common}$ with the first time-domain granularity, and $N_{TA,offset}$ with the first time-domain granularity.

$N_{TA}$ with the first time-domain granularity is determined based on $N_{TA}$ with the time-domain granularity $T_c$, $N_{TA,common}$ with the first time-domain granularity is determined based on $N_{TA,common}$ with the time-domain granularity $T_c$, $N_{TA,offset}$ with the first time-domain granularity is determined based on $N_{TA,offset}$ with the time-domain granularity $T_c$, and $N_{TA,UE-specific}$ with the first time-domain granularity is determined based on the time-domain granularity of $N_{TA,UE-specific}$.

In some embodiments, the first time-domain granularity is a slot.

$N_{TA}$ with the first time-domain granularity is determined based on a following formula:

$$\lceil N_{TA} \times T_c/(10^{-3}/2^\wedge \mu) \rceil = (\lceil 2^\mu * 10^3 * N_{TA} \times T_c \rceil);$$

$N_{TA,common}$ with the first time-domain granularity is determined based on a following formula:

$$\lceil N_{TA,common} \times T_c/(10^{-3}/2^\wedge \mu) \rceil = (\lceil 2^\mu * 10^3 * N_{TA,common} \times T_c \rceil);$$

$N_{TA,offset}$ with the first time-domain granularity is determined based on a following formula:

$$\lceil N_{TA,offset} \times T_c/(10^{-3}/2^\wedge \mu) \rceil = (\lceil 2^\mu * 10^3 * N_{TA,offset} \times T_c \rceil),$$

where $\mu$ represents a subcarrier spacing configuration, and $\lceil \ \rceil$ represents upward rounding.

In some embodiments, the target parameter includes: $N_{TA}$, $N_{TA,UE-specific}$, $N_{TA,common}$ and $N_{TA,offset}$, each of $N_{TA}$, $N_{TA,common}$ and $N_{TA,offset}$ has a time-domain granularity $T_c$, and a time-domain granularity of $N_{TA,UE-specific}$ is not $T_c$.

The second parameter with the first time-domain granularity is obtained by accumulating the first accumulated value with the first time-domain granularity and $N_{TA,UE-specific}$ with the first time-domain granularity.

The first accumulated value with the first time-domain granularity is obtained by accumulating $N_{TA}$ with the time-domain granularity $T_c$, $N_{TA,common}$ with the time-domain granularity $T_c$, and $N_{TA,offset}$ with the time-domain granularity $T_c$; and $N_{TA,UE-specific}$ with the first time-domain granularity is determined based on the time-domain granularity of $N_{TA,UE-specific}$.

In some embodiments, the first time-domain granularity is a slot.

The first accumulated value with the first time-domain granularity is determined based on a following formula:

$$\lceil N_{summation} \times T_c/(10^{-3}/2^\wedge \mu) \rceil = (\lceil 2^\mu * 10^3 * N_{summation} \times T_c \rceil),$$

where $N_{summation}$ represents the first accumulated value, $N_{summation} = N_{TA} + N_{TA,common} + N_{TA,offset}$, $\mu$ represents a subcarrier spacing configuration, and $\lceil \ \rceil$ represents upward rounding.

In some embodiments, the first time-domain granularity is a slot, and $N_{TA,UE-specific}$ has a time-domain granularity s.

$N_{TA,UE-specific}$ with first time-domain granularity is determined based on a following formula:

$$\lceil N_{TA,UE-specific} \times s/(10^{-3}/2^\wedge \mu) \rceil = (\lceil 2^\mu * 10^3 * N_{TA,UE-specific} \times s \rceil),$$

where $\mu$ represents a subcarrier spacing configuration, and $\lceil \ \rceil$ represents upward rounding.

In some embodiments, the second parameter $T_{TA}$ is determined by a following formula:

$$T_{TA} = (N_{TA} + N_{TA,UE-specifiC} + N_{TA,common} + N_{TA,offset}) \times T_c.$$

In some embodiments, $T_c$ is a time unit specified in a protocol.

In some embodiments the communicating unit may be a communication interface or transceiver, or an input-output interface of a communication chip or of a system-on-chip.

It is to be understood that the network device 500 in the embodiment of the present disclosure may correspond to the network device in the method embodiments in the present disclosure, and that the above operations and other operations and/or functions of the various units in the network device 500 are used for implementing the respective flow implemented by the terminal device in the method 200 shown in FIG. 4.

Figure 8:
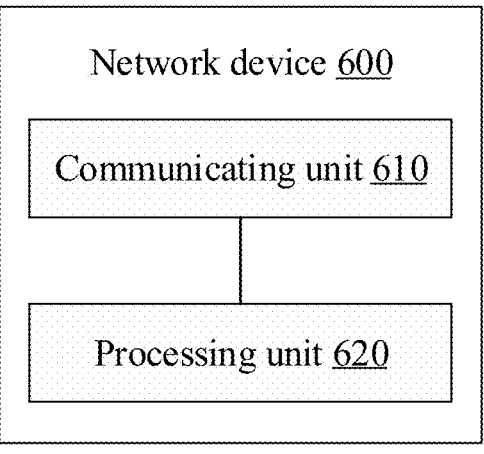
FIG. 8 is a schematic block diagram of another network device according to an embodiment of the present disclosure.

FIG. 8 shows a schematic block diagram of a network device 600 according to an embodiment of the present disclosure. As shown in FIG. 8, the network device 600 includes a communicating unit 610 and a processing unit 620.

The communicating unit 610 is configured to receive a first parameter sent by a terminal device, where the first parameter is used for representing a delay estimated by the terminal device on a service link.

The processing unit 620 is configured to determine a second parameter with a first time-domain granularity according to the first parameter, where the first time-domain granularity is a time-domain granularity associated with a subcarrier, and the second parameter is used for representing a TA.

The processing unit 620 is further configured to determine a timing offset value based on the second parameter with the first time-domain granularity.

In some embodiments, the first parameter has a time-domain granularity $T_c$, and the processing unit 620 is specifically configured to:

determine the second parameter with the time-domain granularity $T_c$ according to the first parameter with the time-domain granularity $T_c$; and convert the time-domain granularity of the second parameter from $T_c$ into the first time-domain granularity, to obtain the second parameter with the first time-domain granularity.

In some embodiments, the first time-domain granularity is a slot, and the processing unit 620 is specifically configured to:

convert the time-domain granularity of the second parameter from $T_c$ into the slot according to a following formula:

$$\lceil T_{TA} \times T_c/(10^{-3}/2^\wedge \mu) \rceil = (\lceil 2^\mu * 10^3 * T_{TA} \times T_c \rceil),$$

where $T_{TA}$ is the second parameter, $\mu$ represents a subcarrier spacing configuration, and $\lceil \ \rceil$ represents upward rounding.

In some embodiments, the first parameter is $N_{TA,UE-specific}$, and the processing unit 620 is specifically configured to:

determine the second parameter with the first time-do-main granularity according to $N_{TA,UE\text{-}specific}$, and $N_{TA}$, $N_{TA,common}$ and $N_{TA,offset}$.

$N_{TA}$ represents a parameter associated with TA and configured by a network device, $N_{TA,common}$ represents a delay between a satellite and a reference point, and $N_{TA,offset}$ represents a fixed offset value for calculating TA.

In some embodiments, each of $N_{TA}$, $N_{TA,UE\text{-}specific}$, $N_{TA,common}$ and $N_{TA,offset}$ has a time-domain granularity $T_c$. The processing unit 620 is specifically configured to:

respectively convert the time-domain granularity of each of $N_{TA}$, $N_{TA,UE\text{-}specific}$, $N_{TA,common}$ and $N_{TA,offset}$ from $T_c$ into the first time-domain granularity; and accumulate $N_{TA}$ with the first time-domain granularity, $N_{TA,UE\text{-}specific}$ with the first time-domain granularity, $N_{TA,common}$ with the first time-domain granularity, and $N_{TA,offset}$ with the first time-domain granularity, to obtain the second parameter with the first time-domain granularity.

In some embodiments, the first time-domain granularity is a slot, and the processing unit 620 is specifically configured to:

convert the time-domain granularity of $N_{TA}$ from $T_c$ into the slot according to a following formula:

$$\lceil N_{TA} \times T_c/(10^{-3}/2^{\wedge}\mu)\rceil = (\lceil 2^{\mu} * 10^3 * N_{TA} \times T_c\rceil);$$

convert the time-domain granularity of $N_{TA,UE\text{-}specific}$ from $T_c$ into the slot according to a following formula:

$$\lceil N_{TA,UE\text{-}specific} \times T_c/(10^{-3}/2^{\wedge}\mu)\rceil = (\lceil 2^{\mu} * 10^3 * N_{TA,UE\text{-}specific} \times T_c\rceil);$$

convert the time-domain granularity of $N_{TA,common}$ from $T_c$ into the slot according to a following formula:

$$\lceil N_{TA,common} \times T_c/(10^{-3}/2^{\wedge}\mu)\rceil = (\lceil 2^{\mu} * 10^3 * N_{TA,common} \times T_c\rceil);$$

convert the time-domain granularity of $N_{TA,offset}$ from $T_c$ into the slot according to a following formula:

$$\lceil N_{TA,offset} \times T_c/(10^{-3}/2^{\wedge}\mu)\rceil = (\lceil 2^{\mu} * 10^3 * N_{TA,offset} \times T_c\rceil),$$

where $\mu$ represents a subcarrier spacing configuration, and $\lceil \ \rceil$ represents upward rounding.

In some embodiments, each of $N_{TA}$, $N_{TA,common}$ and $N_{TA,offset}$ has a time-domain granularity $T_c$, and a time-domain granularity of $N_{TA,UE\text{-}specific}$ is not $T_c$. The processing unit 620 is specifically configured to:

respectively convert the time-domain granularity of each of $N_{TA}$, $N_{TA,common}$ and $N_{TA,offset}$ from $T_c$ into the first time-domain granularity;

convert the time-domain granularity of $N_{TA,UE\text{-}specific}$ into the first time-domain granularity; and accumulate $N_{TA}$ with the first time-domain granularity, $N_{TA,UE\text{-}specific}$ with the first time-domain granularity, $N_{TA,common}$ with the first time-domain granularity, and $N_{TA,offset}$ with the first time-domain granularity, to obtain the second parameter with the first time-domain granularity.

In some embodiments, the first time-domain granularity is a slot, and the processing unit 620 is specifically configured to:

convert the time-domain granularity of $N_{TA}$ from $T_c$ into the slot according to a following formula:

$$\lceil N_{TA} \times T_c/(10^{-3}/2^{\wedge}\mu)\rceil = (\lceil 2^{\mu} * 10^3 * N_{TA} \times T_c\rceil);$$

convert the time-domain granularity of $N_{TA,common}$ from $T_c$ into the slot according to a following formula:

$$\lceil N_{TA,common} \times T_c/(10^{-3}/2^{\wedge}\mu)\rceil = (\lceil 2^{\mu} * 10^3 * N_{TA,common} \times T_c\rceil);$$

and convert the time-domain granularity of $N_{TA,offset}$ from $T_c$ into the slot according to a following formula:

$$\lceil N_{TA,offset} \times T_c/(10^{-3}/2^{\wedge}\mu)\rceil = (\lceil 2^{\mu} * 10^3 * N_{TA,offset} \times T_c\rceil),$$

where $\mu$ represents a subcarrier spacing configuration, and $\lceil \ \rceil$ represents upward rounding.

In some embodiments, each of $N_{TA}$, $N_{TA,common}$ and $N_{TA,offset}$ has a time-domain granularity $T_c$, and a time-domain granularity of $N_{TA,UE\text{-}specific}$ is not $T_c$. The processing unit 620 is specifically configured to:

accumulate $N_{TA}$ with the time-domain granularity $T_c$, $N_{TA,common}$ with the time-domain granularity $T_c$, and $N_{TA,offset}$ with the time-domain granularity $T_c$, to obtain a first accumulated value;

convert a time-domain granularity of the first accumulated value from $T_c$ into the first time-domain granularity;

convert the time-domain granularity of $N_{TA,UE\text{-}specific}$ into the first time-domain granularity; and accumulate the first accumulated value with the first time-domain granularity and $N_{TA,UE\text{-}specific}$ with the first time-domain granularity, to obtain the second parameter with the first time-domain granularity.

In some embodiments, the first time-domain granularity is a slot, and the processing unit 620 is specifically configured to:

convert the time-domain granularity of the first accumulated value from $T_c$ into the slot according to a following formula:

$$\lceil N_{summation} \times T_c/(10^{-3}/2^{\wedge}\mu)\rceil = (\lceil 2^{\mu} * 10^3 * N_{summation} \times T_c\rceil),$$

where $N_{summation}$ represents the first accumulated value, $N_{summation} = N_{TA} + N_{TA,common} + N_{TA,offset}$, $\mu$ represents a subcarrier spacing configuration, and $\lceil \ \rceil$ represents upward rounding.

In some embodiments, the first time-domain granularity is a slot and $N_{TA,UE\text{-}specific}$ has a time-domain granularity $s$. The processing unit 620 is specifically configured to:

convert the time-domain granularity of $N_{TA,UE\text{-}specific}$ from $s$ into the slot according to a following formula:

$$\lceil N_{TA,UE\text{-}specific} \times s/(10^{-3}/2^{\wedge}\mu)\rceil = (\lceil 2^{\mu} * 10^3 * N_{TA,UE\text{-}specific} \times s\rceil),$$

where μ represents a subcarrier spacing configuration, and ⌈ ⌉ represents upward rounding.

In some embodiments, the second parameter $T_{TA}$ is determined by a following formula:

$$T_{TA} = (N_{TA} + N_{TA,UE-specific} + N_{TA,common} + N_{TA,offset}) \times T_c.$$

In some embodiments, $T_c$ is a time unit specified in a protocol.

In some embodiments, the communicating unit may be a communication interface or transceiver, or an input-output interface of a communication chip or of a system-on-chip.

It is to be understood that the network device 600 in the embodiment of the present disclosure may correspond to the network device in the method embodiments in the present disclosure, and that the above operations and other operations and/or functions of the various units in the network device 600 are used for implementing the respective flows implemented by the terminal device in the method 300 shown in FIG. 5.

Figure 9:
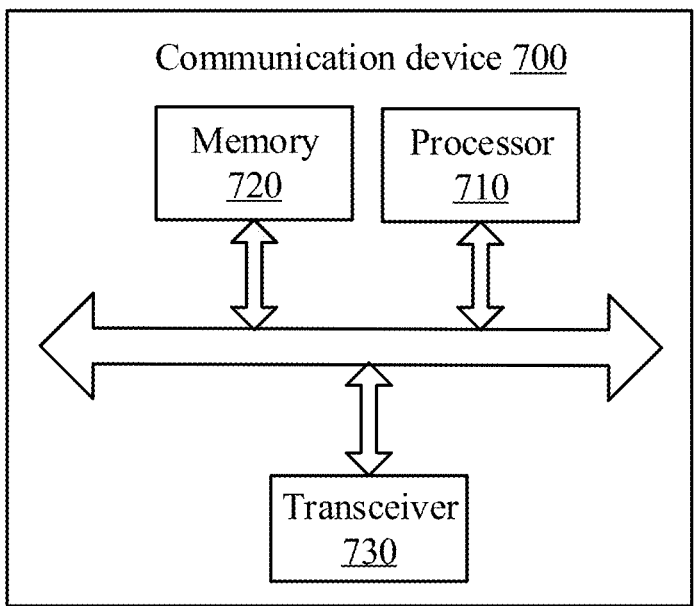
FIG. 9 is a schematic block diagram of a communication device according to an embodiment of the present disclosure.

FIG. 9 is a schematic structural diagram of a communication device 700 according to an embodiment of the present disclosure. The communication device 700 shown in FIG. 9 includes a processor 710 that may invoke and run a computer program from a memory to implement the method in the embodiments of the present disclosure.

In some embodiments, as shown in FIG. 9, the communication device 700 may also include a memory 720. The processor 710 may invoke and run a computer program from the memory 720 to implement the method in the embodiments of the present disclosure.

The memory 720 may be a separate device independent of the processor 710, or the memory 720 may be integrated into the processor 710.

In some embodiments, as shown in FIG. 9, the communication device 700 may also include a transceiver 730. The processor 710 may control the transceiver 730 to communicate with other devices, and in particular to send information or data to other devices, or receive information or data sent by other devices.

The transceiver 730 may include a transmitter and a receiver. The transceiver 730 may further include an antenna(s), the number of which may be one or more.

In some embodiments, the communication device 700 may be specifically the network device in the embodiments of the present disclosure, and the communication device 700 may implement the corresponding flows implemented by the network device in each method of the embodiments of the present disclosure, which will not be repeated herein for the sake of brevity.

In some embodiments, the communication device 700 may be the terminal device in the embodiments of the present disclosure, and the communication device 700 may implement the corresponding flows implemented by the terminal device in each method of the embodiments of the present disclosure, which will not be repeated herein for the sake of brevity.

Figure 10:
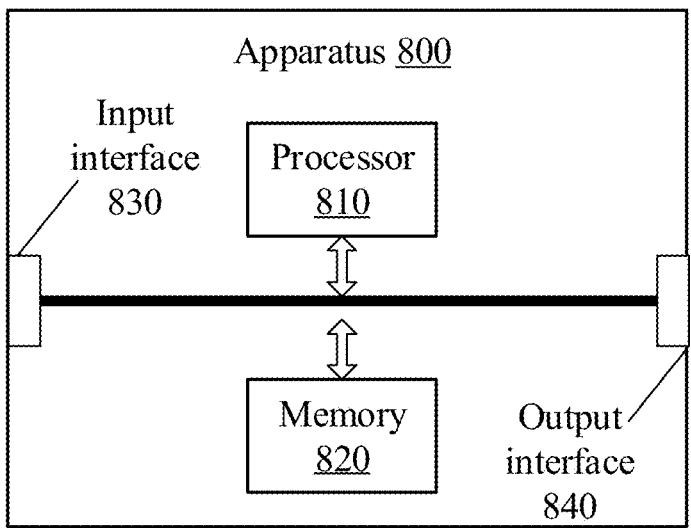
FIG. 10 is a schematic block diagram of an apparatus according to an embodiment of the present disclosure.

FIG. 10 is a schematic structural diagram of an apparatus according to an embodiment of the present disclosure. The apparatus 800 shown in FIG. 10 includes a processor 810 that may invoke and run a computer program from a memory to implement the method in the embodiments of the present disclosure.

In some embodiments, as shown in FIG. 10, the apparatus 800 may also include a memory 820. The processor 810 may invoke and run a computer program from the memory 820 to implement the method in the embodiments of the present disclosure.

The memory 820 may be a separate device independent of the processor 810 or the memory 820 may be integrated in the processor 810.

In some embodiments, the apparatus 800 may also include an input interface 830. The processor 810 may control the input interface 830 to communicate with other devices or chips, and in particular may obtain information or data sent by other devices or chips.

In some embodiments, the apparatus 800 may also include an output interface 840. The processor 810 may control the output interface 840 to communicate with other devices or chips, and in particular may output information or data to other devices or chips.

In some embodiments, the apparatus may be applied to the network device in the embodiments of the present disclosure, and the apparatus may implement the corresponding flows implemented by the network device in each method of the embodiments of the disclosure, which will not be repeated herein for the sake of brevity.

In some embodiments, the apparatus may be applied to the terminal device in the embodiments of the present disclosure, and the apparatus may implement the corresponding flows implemented by the terminal device in each method of the embodiment of the disclosure, which will not be repeated herein for the sake of brevity.

In some embodiments, the apparatus mentioned in the embodiments of the present disclosure may be a chip. For example, the apparatus may be a system level chip, a system chip, a chip system or an on-chip system chip, etc.

Figure 11:
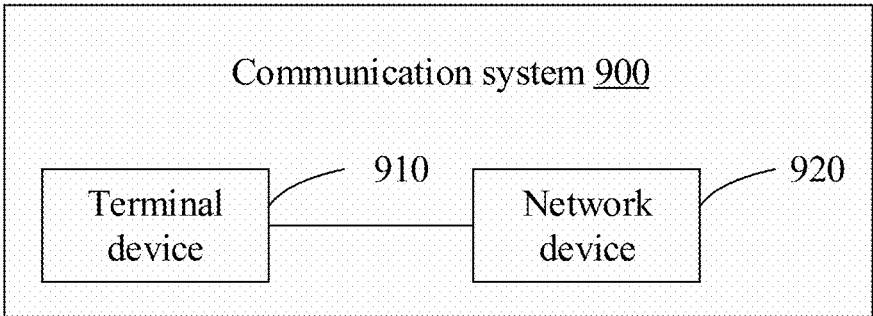
FIG. 11 is a schematic block diagram of a communication system according to an embodiment of the present disclosure.

FIG. 11 is a schematic block diagram of a communication system 900 according to an embodiment of the present disclosure. As shown in FIG. 11, the communication system 900 includes a terminal device 910 and a network device 920.

The terminal device 910 may be used for implementing the corresponding functions implemented by the terminal device in the above-mentioned methods, and the network device 920 may be used for implementing the corresponding functions implemented by the network device in the above-mentioned methods, which will not be repeated herein for the sake of brevity.

It is to be understood that the processor of the embodiments of the disclosure may be an integrated circuit chip with signal processing capacity. In an implementation process, various steps of the above method embodiments may be completed by integrated logic circuits of hardware in the processor or instructions in the form of software. The above processor may be a general-purpose processor, a Digital Signal Processor (DSP), an Application Specific Integrated Circuit (ASIC), a Field Programmable Gate Array (FPGA), or other programmable logic devices, discrete gate or transistor logic devices, and discrete hardware components. Various methods, steps, and logical block diagrams disclosed in the embodiments of the disclosure may be implemented or performed. The general-purpose processor may be a microprocessor, any conventional processor, or the like. Steps of the methods disclosed with reference to the embodiments of the disclosure may be directly performed and accomplished by a hardware decoding processor, or may be performed and accomplished by a combination of hardware and software modules in the decoding processor. The software modules may be located in a storage medium mature in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor.

It may be understood that the memory in the embodiments of the disclosure may be a volatile memory or a non-volatile memory, or may include a volatile memory and a non-volatile memory. The non-volatile memory may be a read-only memory (ROM), a programmable ROM (PROM), an erasable PROM (EPROM), an electrically EPROM (EE-PROM), or a flash memory. The volatile memory may be a random access memory (RAM), which is used as an external high-speed cache. By way of example but not restrictive description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of the systems and methods described in this specification includes but is not limited to these and any other proper types of memories.

It is to be understood that the abovementioned memories are exemplary but not restrictive, for example, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM). That is to say, the memories described in the embodiment of the disclosure are intended to include, but not limited to, these and any other suitable types of memories.

The embodiments of the disclosure further provide a computer-readable storage medium, which is configured to store a computer program.

In some embodiments, the computer-readable storage medium may be applied to the network device in the embodiments of the disclosure. The computer program enables a computer to execute corresponding flows implemented by the network device in each method of the embodiments of the disclosure, which will not be elaborated here for simplicity.

In some embodiments, the computer-readable storage medium may be applied to the terminal device in the embodiments of the disclosure. The computer program enables a computer to execute corresponding flows implemented by the terminal device in each method of the embodiments of the disclosure, which will not be elaborated here for simplicity.

The embodiments of the disclosure further provide a computer program product, which includes a computer program instruction.

In some embodiments, the computer program product may be applied to the network device in the embodiments of the disclosure. The computer program instruction enables a computer to execute corresponding flows implemented by the network device in each method of the embodiments of the disclosure, which will not be elaborated here for simplicity.

In some embodiments, the computer program product may be applied to the terminal device in the embodiments of the disclosure. The computer program instruction enables a computer to execute corresponding flows implemented by the terminal device in each method of the embodiments of the disclosure, which will not be elaborated herein for simplicity.

The embodiment of the application also provides a computer program.

In some embodiments, the computer program may be applied to a network device in the embodiments of the disclosure. The computer program, when running on a computer, enables the computer to execute corresponding flows implemented by the network device in each method of the embodiments of the disclosure, which will not be elaborated here for simplicity.

In some embodiments, the computer program may be applied to the terminal device in the embodiments of the disclosure. When running on a computer, the computer program enables the computer to execute corresponding flows implemented by the terminal device in each method of the embodiments of the disclosure, which will not be elaborated here for simplicity.

According to the technical scheme in the first aspect and the second aspect, the first parameter and/or the second parameter for determining the timing offset value that are reported by the terminal device have the time-domain granularities associated with the subcarrier, and the timing offset value also has a time-domain granularity associated with the subcarrier. That is to say, the terminal device may convert the time-domain granularity of the information for determining the timing offset value $K_{offset}$ that is reported by the terminal device to be consistent with the time-domain granularity of the timing offset value $K_{offset}$, thereby facilitating the network device to determine the timing offset value $K_{offset}$.

According to the technical scheme in the third aspect, the network device determines the second parameter with the first time-domain granularity according to the first parameter reported by the terminal device, and determines the timing offset value based on the second parameter with the first time-domain granularity. Since the first time-domain granularity is associated with the subcarrier, and the time-domain granularity of the timing offset value is also associated with the subcarrier, i.e., the network device may convert the time-domain granularity of the information for determining the timing offset value $K_{offset}$ that is reported by the terminal device to be consistent with the time-domain granularity of the timing offset value $K_{offset}$, it is favorable for the network device to determine the timing offset value $K_{offset}$.

Those of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may implement the described functions for each particular disclosure by different methods, but the implementation shall not be considered beyond the scope of the disclosure.

It may be clearly understood by a person skilled in the art that, for the purpose of convenient and brief description, for a detailed working process of the foregoing system, apparatus, and units, reference may be made to a corresponding process in the foregoing method embodiments, and details are not described again herein.

In the several embodiments provided in the disclosure, it is to be understood that the disclosed system, apparatus, and methods may be implemented in other modes. For example, the apparatus embodiments described above are only schematic, and for example, division of the units is only logic function division, and other division manners may be adopted during practical implementation. For example, multiple units or components may be combined or integrated into another system, or some characteristics may be neglected or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over multiple network units. Some or all of the units may be selected according to actual needs to achieve the objectives of the solutions of the embodiments.

In addition, functional units in various embodiments of the disclosure may be integrated into one processing unit, or each of the units may be physically separated, or two or more units may be integrated into one unit.

When the functions are realized in a form of software functional units and sold or used as an independent product, they may be stored in a computer-readable storage medium. With respective to this understanding, the technical solutions of the embodiments of the disclosure essentially or the parts that contribute to the prior art, or part of the technical solutions can be embodied in the form of a software product. The computer software product is stored in a storage medium, including multiple instructions for causing a computer device (which may be a personal computer, a server, or a network device, and the like) to execute all or part of the steps of the method described in the embodiments of the disclosure. The foregoing storage medium includes a USB flash disk, a mobile hard disk drive, an ROM, an RAM, and various media that can store program codes, such as a magnetic disk or an optical disk.

The above descriptions are merely specific implementations of the disclosure, but are not intended to limit the scope of protection of the disclosure. Any variation or replacement readily figured out by a person skilled in the art within the technical scope disclosed in the disclosure shall fall within the scope of protection of the disclosure. Therefore, the scope of protection of the disclosure is defined by the scope of protection of the claims.

The invention claimed is:

1. A method for wireless communication, comprising:

sending, by a terminal device, first information for determining a timing offset value, wherein the first information is a second parameter with a first time-domain granularity, the first time-domain granularity is a time-domain granularity associated with a subcarrier, and the second parameter is used for representing a Timing Advance (TA), the method further comprising:

determining, by the terminal device, the second parameter with the first time-domain granularity according to a target parameter, wherein the target parameter comprises $N_{TA,UE-specific}$, and $N_{TA,UE-specific}$ has a time-domain granularity $T_c$, where $N_{TA,UE-specific}$ represents the delay of the service link estimated by the terminal device, and $T_c$ is a time unit specified in a protocol, wherein determining, by the terminal device, the second parameter with the first time-domain granularity according to the target parameter comprises:

determining, by the terminal device, the second parameter with the time-domain granularity $T_c$ according to the $N_{TA,UE-specific}$ with the time-domain granularity $T_c$;

converting, by the terminal device, a time-domain granularity of the second parameter from $T_c$ into the first time-domain granularity, to obtain the second parameter with the first time-domain granularity, wherein the first time-domain granularity is a slot, and converting, by the terminal device, the time-domain granularity of the second parameter from $T_c$ into the first time-domain granularity comprises:

converting, by the terminal device, the time-domain granularity of the second parameter from $T_c$ to the slot according to a following formula:

$$\left\lceil T_{TA} \times T_c / (10^{-3}/2^{\wedge}\mu) \right\rceil = \left( \left\lceil 2^{\mu} * 10^3 * T_{TA} \times T_c \right\rceil \right),$$

where $T_{TA}$ is the second parameter, $\mu$ represents a subcarrier spacing configuration, and $\lceil\ \rceil$ represents upward rounding.

2. The method of claim 1, wherein the $T_{TA}$ is determined by a following formula:

$$T_{TA} = (N_{TA} + N_{TA,UE-specific} + N_{TA,common} + N_{TA,offset}) \times T_c,$$

where $N_{TA}$ represents a parameter associated with TA and configured by a network device, $N_{TA,common}$ represents a delay between a satellite and a reference point, and $N_{TA,offset}$ represents a fixed offset value for calculating TA.

3. A terminal device, comprising: a processor and a memory for storing a computer program, wherein the processor is configured to invoke and execute the computer program from the memory to cause the terminal device to:

send first information for determining a timing offset value, wherein the first information is a second parameter with a first time-domain granularity, the first time-domain granularity is a time-domain granularity associated with a subcarrier, and the second parameter is used for representing a Timing Advance (TA), wherein the processor is further configured to invoke and execute the computer program from the memory to cause the terminal device to:

determine the second parameter with the first time-domain granularity according to a target parameter, wherein the target parameter comprises $N_{TA,UE-specific}$, and $N_{TA,UE-specific}$ has a time-domain granularity $T_c$, where $N_{TA,UE-specific}$ represents the delay of the service link estimated by the terminal device, and $T_c$ is a time unit specified in a protocol, wherein the processor is specifically configured to invoke and execute the computer program from the memory to cause the terminal device to:

determine the second parameter with the time-domain granularity $T_c$ according to the $N_{TA,UE-specific}$ with the time-domain granularity $T_c$;

convert a time-domain granularity of the second parameter from $T_c$ into the first time-domain granularity, to obtain the second parameter with the first time-domain granularity, wherein the processor is specifically configured to invoke and execute the computer program from the memory to cause the terminal device to:

convert the time-domain granularity of the second parameter from $T_c$ to the slot according to a following formula:

$$\left\lceil T_{TA} \times T_c / \left(10^{-3}/2^\wedge \mu\right)\right\rceil = \left(\left\lceil 2^\mu * 10^3 * T_{TA} \times T_c\right\rceil\right),$$

where $T_{TA}$ is the second parameter, $\mu$ represents a sub-carrier spacing configuration, and $\lceil\ \rceil$ represents upward rounding.

4. The terminal device of claim 3, wherein the $T_{TA}$ is determined by following formula:

$$T_{TA} = (N_{TA} + N_{TA,UE-specific} + N_{TA,common} + N_{TA,offset}) \times T_c,$$

where $N_{TA}$ represents a parameter associated with TA and configured by a network device, $N_{TA,common}$ represents a delay between a satellite and a reference point, and $N_{TA,offset}$ represents a fixed offset value for calculating TA.

5. A network device, comprising: a processor and a memory for storing a computer program, wherein the processor is configured to invoke and execute the computer program from the memory to cause the network device to:

receive first information sent by a terminal device, wherein the first information is used for determining a timing offset value, wherein the first information is a second parameter with a first time-domain granularity, the first time-domain granularity is a time-domain granularity associated with a subcarrier, and the second parameter is used for representing a Timing Advance (TA), wherein the second parameter with the first time-domain granularity is determined based on a target parameter, wherein the target parameter comprises $N_{TA,UE-specific}$, and $N_{TA,UE-specific}$ has a time-domain granularity $T_c$, where $N_{TA,UE-specific}$ represents the delay of the service link estimated by the terminal device, and $T_c$ is a time unit specified in a protocol, wherein the second parameter with the first time-domain granularity is determined based on the second parameter with the time-domain granularity $T_c$, and the second parameter with the time-domain granularity $T_c$ is determined based on the $N_{TA,UE-specific}$ with the time-domain granularity $T_c$, wherein the first time-domain granularity is a slot, and the second parameter with the first time-domain granularity is determined based on a following formula:

$$\left\lceil T_{TA} \times T_c / \left(10^{-3}/2^\wedge \mu\right)\right\rceil = \left(\left\lceil 2^\mu * 10^3 * T_{TA} \times T_c\right\rceil\right),$$

where $T_{TA}$ is the second parameter, $\mu$ represents a sub-carrier spacing configuration and $\lceil\ \rceil$ represents upward rounding.

6. The network device of claim 5, wherein the $T_{TA}$ is determined by following formula:

$$T_{TA} = (N_{TA} + N_{TA,UE-specific} + N_{TA,common} + N_{TA,offset}) \times T_c,$$

where $N_{TA}$ represents a parameter associated with TA and configured by a network device, $N_{TA,common}$ represents a delay between a satellite and a reference point, and $N_{TA,offset}$ represents a fixed offset value for calculating TA.

* * * * *